US012210938B1

(12) United States Patent
Jacob et al.

(10) Patent No.: US 12,210,938 B1
(45) Date of Patent: Jan. 28, 2025

(54) SYSTEMS FOR GENERATING CUSTOMIZED DATASETS

(71) Applicant: State Farm Mutual Automobile Insurance Company, Bloomington, IL (US)

(72) Inventors: Michael Shawn Jacob, LeRoy, IL (US); Manali B Desai, Bloomington, IL (US); Joshua Robert Brown, Bloomington, IL (US); Oscar Allan Arulfo, Bloomington, IL (US); Leah Nicole Garcia, Hudson, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 1184 days.

(21) Appl. No.: 16/993,826

(22) Filed: Aug. 14, 2020

(51) Int. Cl.
*G06N 20/00* (2019.01)
*G06F 16/22* (2019.01)
*G06F 16/2458* (2019.01)

(52) U.S. Cl.
CPC ......... *G06N 20/00* (2019.01); *G06F 16/2228* (2019.01); *G06F 16/2465* (2019.01); *G06F 2216/03* (2013.01)

(58) Field of Classification Search
CPC . G06N 20/00; G06F 16/2228; G06F 16/2465; G06F 2216/03
See application file for complete search history.

(56) References Cited

U.S. PATENT DOCUMENTS

| 7,035,699 B1 | 4/2006 | Anderson et al. |
| 9,397,904 B2 | 7/2016 | Berlingerio et al. |
| 2013/0030854 A1* | 1/2013 | McCormack .......... G06Q 30/01 705/7.14 |

(Continued)

FOREIGN PATENT DOCUMENTS

WO    WO1998049641 A1    11/1998

OTHER PUBLICATIONS

Reynolds, Chastin, "Claims Triage: Basics for Insurance Carriers," BriteCore, retrieved from https://www.britecore.com/claimstriage, Oct. 2019, 1 page.

(Continued)

*Primary Examiner* — Hope C Sheffield
(74) *Attorney, Agent, or Firm* — Lee & Hayes, P.C.

(57) ABSTRACT

This disclosure provides systems for generating customized datasets. An example dataset generator mines contacts from multiple members of an enterprise, applies a pattern recognition process to determine attributes of the contacts aligned with objectives of the enterprise, stores the contacts and associated attributes in a relational data structure, and through a machine learning process, generates a customized contact dataset of the contacts with attributes relevant to a user request, an event, or a notification received. The example dataset generator may also generate an action steps dataset for the user. The dataset generator may aggregate contacts from calls, chats, emails, SMS messages, and video feeds of an enterprise, apply a pattern recognition process to determine attributes of the contacts, and through a machine learning process, partition and distribute the contacts and associated action steps on respective dashboards of multiple customer service representatives of the enterprise.

20 Claims, 14 Drawing Sheets

(56) References Cited

U.S. PATENT DOCUMENTS

| | | |
|---|---|---|
| 2014/0280134 A1 | 9/2014 | Horen et al. |
| 2015/0161625 A1 | 6/2015 | Heath et al. |
| 2015/0205842 A1* | 7/2015 | Jain ................. G06Q 10/10 |
| | | 707/732 |
| 2016/0019661 A1* | 1/2016 | Bouganim ........... G06Q 50/01 |
| | | 705/319 |
| 2016/0189082 A1* | 6/2016 | Garrish ............. G06Q 30/01 |
| | | 705/7.39 |
| 2018/0114238 A1* | 4/2018 | Treiser ........... G06Q 30/0204 |
| 2021/0203784 A1* | 7/2021 | Konig ............... G06Q 30/01 |

OTHER PUBLICATIONS

P. Schweizer, "What is Lead Scoring and Why Should I Care?" SalesWingsApp. Retrieved from https://www.saleswingsapp.com/lead-scoring/what-is-lead-scoring-executive-summary/, Oct. 2019, 7 pages.

* cited by examiner

SYSTEMS FOR GENERATING CUSTOMIZED DATASETS

TECHNICAL FIELD

The present disclosure relates generally to enterprise knowledge systems, and more specifically to systems for automatically generating customized datasets and templates for furthering the mission and goals of a business, corporation, or organization.

BACKGROUND

Certain conventional computer and smartphone applications that are used in a business enable a user, such as an employee of the business, to organize a list of contacts. In some cases, a conventional application allows the user to create a hotlist of people to contact for a given project or marketing campaign by applying user-selected filters to the company's database of contacts, or to the user's own personal contacts. A "contact" residing in a dataset of contacts on a personal device may include a name and/or a phone number, or may be a more extensive record including a mailing address, an email address, and/or other personal identifiers, demographics, attributes, and associations.

A user of a conventional application may filter a large database of customer contacts by several filters at once to obtain a contact dataset. For example, a user may filter such a database to identify contacts who live in a specified area, who have birthdays in a particular month, who have purchased a particular product in the current calendar year, and so forth. But in a business context, such filter criteria are conventionally limited to the information already associated with the customer in the customer's online account or company account records, and limited by the customer's order history, for example.

In a large business, a contact center of the business handles large volumes of contacts across a distributed computer and cloud system, with hundreds and thousands of contacts associated with various types of contact profiles routed through various live and stored media, such as telephony, email, messaging, chat, video calls, and in-person encounters. A contact dataset of encounters in-flight, such as "calls waiting" is often handled inefficiently, with haphazard assignment of calls to the next available customer service representative, with no special routing purpose. Large contact center systems are conventionally focused on handling a current load, not on applying a business objective to render the prioritizing and routing of contacts into a business opportunity.

For premeditated sales planning, when a very focused dataset of contacts is desired or when a company's agent is tasked with formulating a contact dataset of potential customers in order to address a new circumstance, new product, or an upcoming event, the task of building a contact dataset can become labor-intensive and prone to error. The user often knows the desired selection criteria for making a contact dataset and knows objectives that the dataset is to fulfill, but may not know how to convert the search criteria and objectives into an actual contact dataset without evaluating each individual contact manually.

Moreover, the motivation for creating a focused dataset of contacts is often lost once the dataset is generated. Elements of experience, luck, research, and insight that resulted in a successful contact dataset are often not recorded and not saved to data storage. This loss of strategy applies to conventional contact datasets constructed manually and automatically. Insights that resulted in a successful contact dataset are usually not recorded in a manner that can be taken advantage of later by other company agents, or that can be used as a training tool for other users.

The various examples described in the present disclosure are directed toward overcoming the difficulties described above.

SUMMARY

In an example of the present disclosure, an example mines contacts from contact datasets of multiple members of an enterprise, applies a pattern recognition process to determine attributes of the contacts aligned with a success objective of the enterprise, stores the contacts and associated attributes in a first relational data structure, receives a user request, news of an event, or a notification, and through a machine learning process, generates a customized contact dataset of the contacts with attributes relevant to the user request, the event, or the notification. The example method may further mine strategy elements from user strategy records of the enterprise, apply the pattern recognition process to determine attributes of the strategy elements aligned with the success objective of the enterprise, store the strategy elements and associated attributes in a second relational data structure, and through the machine learning process, generate an action steps dataset of the strategy elements with attributes relevant to the customized contact data set, the user request, the event, or the notification.

In another example of the present disclosure, an example method aggregates contacts from calls, chats, emails, SMS messages, and video feeds of an enterprise, applies a pattern recognition process to determine attributes of the contacts, at least one of the attributes aligned with a queuing objective of the enterprise, arranges the contacts and associated attributes in a first relational data structure, and through a machine learning process, displays the contacts on a dashboard of an agent of the enterprise in a queuing order aligned with the queuing objective of the enterprise. The example method may include training the machine learning process in real time simultaneous with displaying the contacts on the dashboard of the agent in real time in the queuing order. The example method may also mine and display actions steps for the agent.

Another example of the present disclosure comprises one or more processors, a memory, a non-transitory computer-readable medium, and stored instructions executable by the one or more processors for implementing a process comprising: mining contacts from contact datasets of multiple members of an enterprise, applying a pattern recognition process to determine attributes of the contacts aligned with a success objective of the enterprise, storing the contacts and associated attributes in a first relational data structure, receiving a user request, news of an event, or a notification, and through a machine learning process, generating a customized contact dataset of the contacts with attributes relevant to the user request, the event, or the notification.

This summary is not intended to identify key or essential features of the claimed subject matter, nor is it intended to limit the scope of the claimed subject matter.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Overview

This disclosure describes systems for generating customized datasets. An example system applies artificial intelligence (AI) to generate customized contact datasets for a user. "Contact dataset" is used broadly herein to designate a set of names, phone numbers, email addresses, and other attributes, as introduced above. The qualifiers and characteristics associated with the name or identifier of a person or company in a given contact dataset are called "attributes" herein. Contact datasets are ubiquitously used in all businesses and on most personal computing devices as a collection of names and numbers, such as a "phone book" or simply "contacts." Each name or entity in a contact dataset 104 is a contact.

In an implementation, the example system can also generate action steps datasets, informally known as "to do" lists, which provide a suggested course of action by providing one or more actions that a user can perform. The example system can apply AI to select and prioritize the contacts or the action steps in the datasets generated.

At least some users in an enterprise are routinely tasked with formulating customized contact datasets, and/or action steps datasets for proactive marketing, for sending updates, offers, notices, alerts, news, and surveys, and for providing customer service, for example. Example dataset generators 100, 200, 300, 1000, 1100 described herein can produce the customized contact datasets and the action steps datasets, generated by operation or assistance of AI. In an example configuration, the dataset generator 100, 200, 300, 1000, 1100 can also apply AI to attributes of the user requesting a dataset and to the user's circumstances in order to customize the requested datasets to that user.

In an example configuration, the system generates a customized contact dataset and/or an action steps dataset and then partitions and intelligently distributes the given dataset among a group of current users, such as an active shift of customer service representatives in a business.

The dataset generators 100, 200, 300, 1000, 1100 described herein are suitable for various corporate settings and for various individual and standalone settings.

Example Systems

Figure 1:
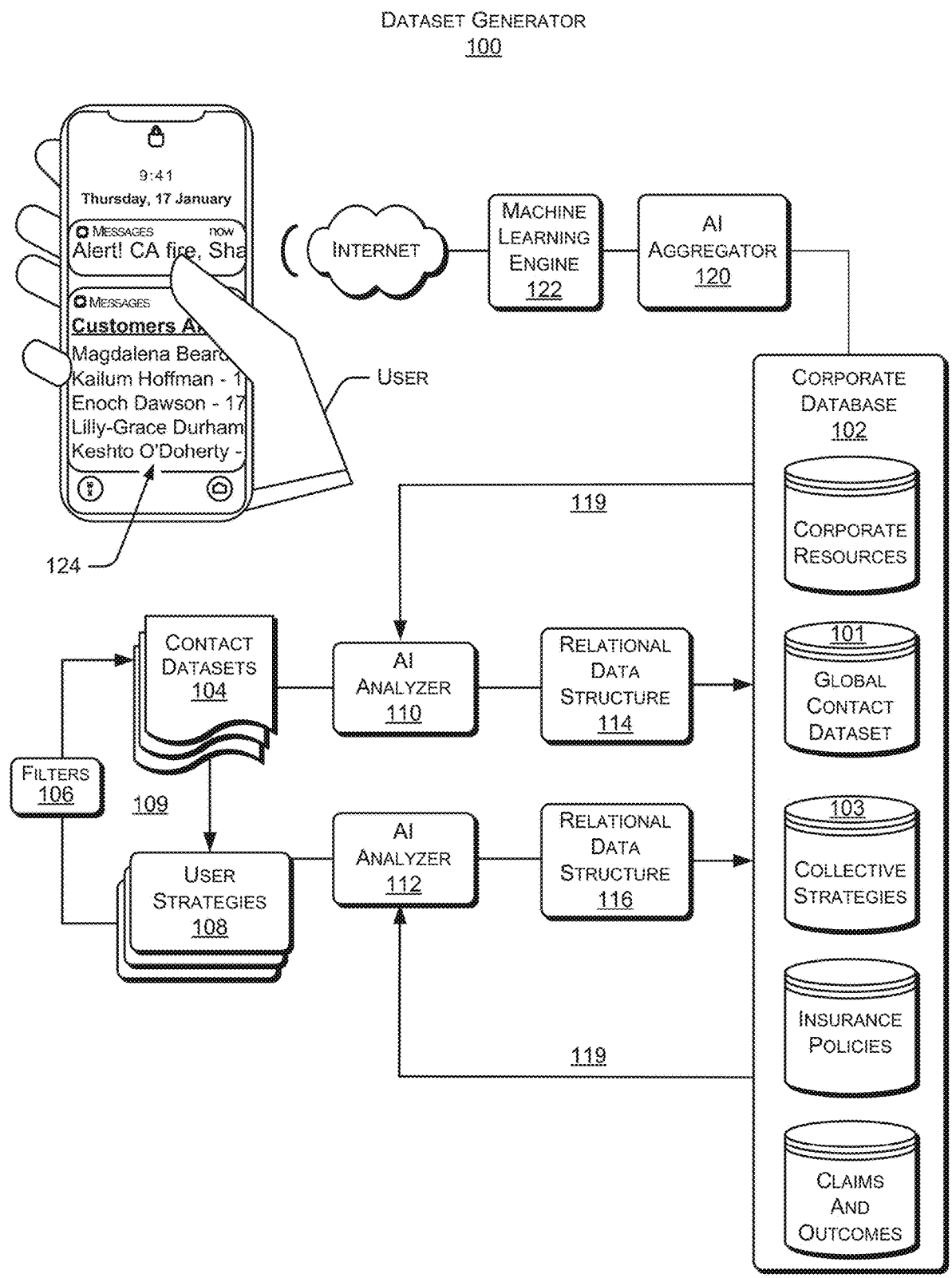
FIG. 1 is a block diagram of an example dataset generator for an enterprise configured to generate a customized contact dataset.
Figure 2:
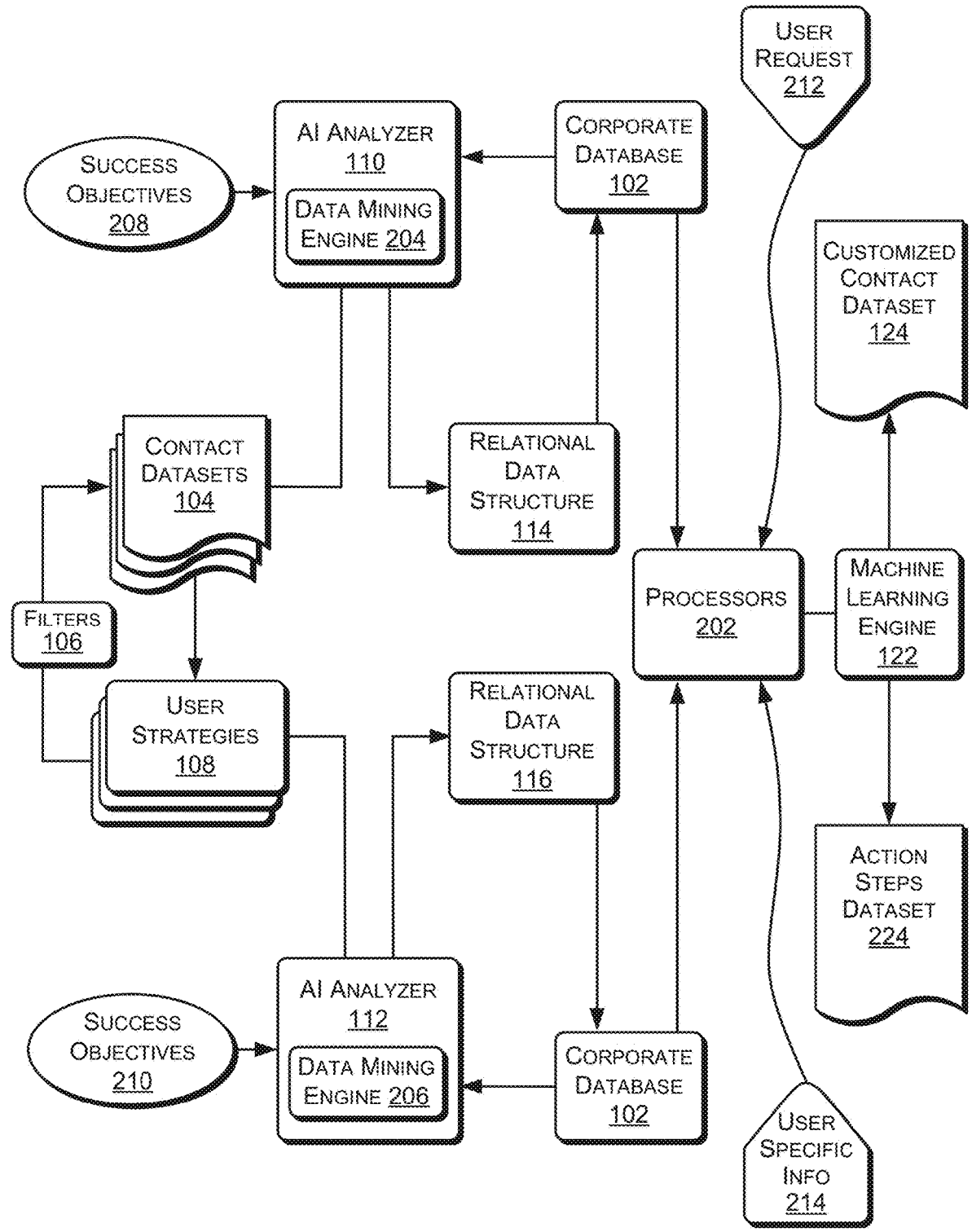
FIG. 2 is a block diagram the example dataset generator configured to generate an action steps dataset.
Figure 3:
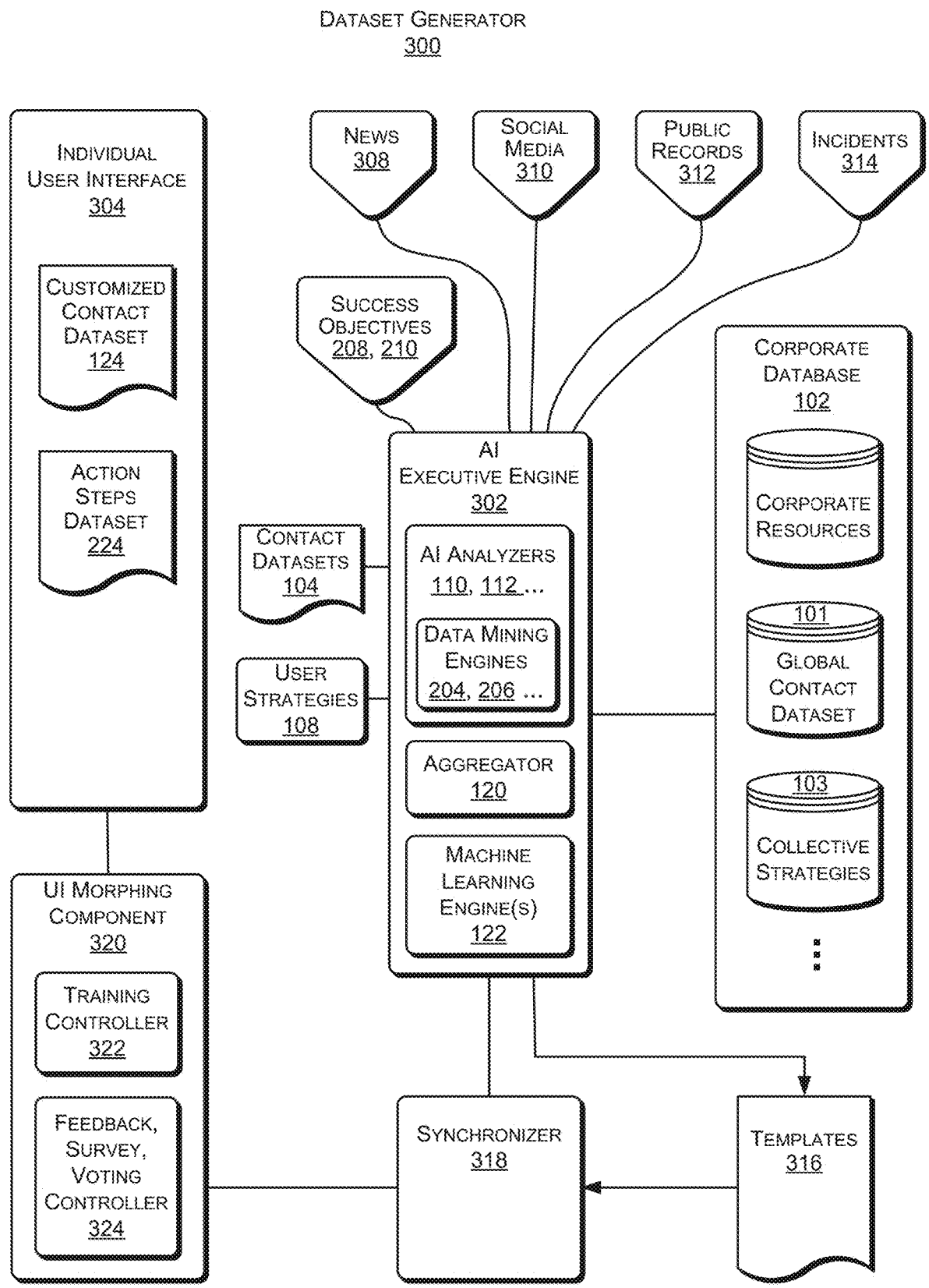
FIG. 3 is a block diagram of the example dataset generator configured to mine public information sources.

FIGS. 1-3 show an example architecture of the system introduced above, implemented as a dataset generator 100, 200, 300. Each figure shows functional relationships between components, which may be distributed on different devices or even distributed in different geographical locations. Each of FIGS. 1-3 show different aspects of the dataset generator 100, 200, 300, emphasizing different components. The dataset generator 100, 200, 300 may be implemented in a distributed client/server-based architecture, residing in a hardware system of computing devices, mobile devices, and cloud hardware. Besides the illustrated components in FIGS. 1-3, the dataset generator 100, 200, 300 also contains components generally present in computing devices, such as one or more processors, memory, data storage, buses, network interface modules, input/output devices and drivers, system software, bios, user interfaces, device interfaces, device drivers, and so forth. These components may be present in the dataset generator 100, 200, 300 depicted in FIGS. 1-3 as fabric of the computing architecture, but are not shown in order to emphasize the subject matter. When the dataset generator 100, 200, 300 is implemented using cloud services, the cloud hardware and software are also part of the computing fabric of the dataset generator 100, 200, 300. Dataset generator 100,300, 300 may be utilized by a single corporation, organization, or home.

FIG. 1 shows an example dataset generator 100, as introduced above. Dataset generator 100 includes a corporate database 102, contact datasets 104 produced by individual users, filters 106 by which individual users create the contact datasets 104, AI analyzers 110, 112, relational data structures 114, 116, global contact dataset 101, and a database of collective strategies 103. Dataset generator 100 also includes AI aggregator 120, machine learning engine 122, and customized contact dataset 124. The global contact dataset 101 and the database of collective strategies 103 can reside in the corporate database 102. The relational data structures 114, 116 are representative. These may be third-party resources and/or cloud functions that relate data elements to each other, such as attributes of a contact to other attributes of the contact, for example. The layout of components in FIG. 1 is one example configuration to show distributed components, their functionality, process flow, and interaction of components with each other.

A user of the dataset generator 100 within an enterprise may be an employee of the business, or in the example of an insurance company as the enterprise, an insurance agent, sales representative, customer service representative, executive, or other participant in the company. Access to the corporate database 102 and other components of the dataset generator 100 shown in FIG. 1 may be enabled by an application accessible to the user on desktop and mobile computing devices.

In FIG. 1, the configuration of dataset generator 100 illustrates two main operations that may be involved in generating a customized contact dataset 124. First, the dataset generator 100 builds a global contact dataset 101 for a business in an ongoing manner. To do this, AI analyzer 110 mines contacts and associated attributes from multiple contact datasets 104 of individual members of the business (and from other information sources) and stores these contacts and attributes as relational data structure 114 in the global contact dataset 101.

Second, the dataset generator 100 produces a customized contact dataset 124 from the global contact dataset 101 (and from other information sources) upon user request or other trigger, such as occurrence of an event or upon receiving a notification. These two operations of (1) building the global contact dataset 101 by mining contact datasets 104, and (2) producing the customized contact dataset 124 from the global contact dataset 101 and from other information sources can be concatenated: the two operations do not need to be separate, although they can be performed independently. In other words, the dataset generator 100 may produce an instance of the customized contact dataset 124 directly from contact datasets 104 while also building the global contact dataset 101 of the company from attributes of contact datasets 104 residing on individual machines, at the same time.

In general, the dataset generator 100 can produce a customized set of objects, the customized contact dataset 124 being just one example. The difference between a contact dataset 104 as shown in FIG. 1, and a customized contact dataset 124, also shown in FIG. 1, may be understood by analogy using a conventional rolodex. A rolodex is a rotating file device consisting of paper cards used to store business contact information. The contact dataset 104 may be a rolodex, whereas the customized contact dataset 124 may be a group or subset of contacts selected from the entire rolodex for a specific purpose. Thus, a customized contact dataset 124 would be a set of names or other identifiers selected from a larger global contact dataset 101 or from a collection of multiple separate contact datasets 124 residing in individual smartphones and email accounts, for example, or selected from public and private databases and information feeds available to an operating business. In another example, selecting a set of email addresses for inviting attendees ("contacts") to a virtual meeting or teleconference on a certain date is another simple example of manually constructing a conventional customized contact dataset 124. In making such a simple conventional customized contact dataset 124, entries are selected from one or more larger contact datasets 101, 104 that contain unselected entries or records to draw from. Coordinating hundreds of customer service calls of a business into a real time prioritized (customized) contact dataset 124 is a more complex example of constructing a customized contact dataset 124, that can be performed by the dataset generator 100 of FIG. 1.

The contact datasets 101, 104 utilized by the dataset generator 100 are not limited to just names, addresses, phone numbers, and email addresses of each contact. In a business context, a contact dataset 104 may include personal names, company names, phone numbers, and addresses, but also associations between a person or company with other persons or companies, roles, positions, relationships, history (ies), company permissions, and many other data elements. A given contact dataset 104 may also include names of customers, potential customers and clients, names of unclassified persons, and names of companies, and entities outside the user's organization, with various qualifiers associated with each person or entity in the given contact dataset 104.

Some attributes of a contact in a contact dataset 104 may be immediately evident, such as person's age or a person's address or phone number. Other attributes may be purposely attached to contacts in a contact dataset 104 by a user of the dataset generator 100 or by the business utilizing the dataset generator 100. For example, a company using the dataset generator 100 might attach a history of purchased products to a "customer" contact in a contact dataset 104. In this case, the products that have been purchased in the past are attributes of that contact. An operating system of a computing device that is hosting at least a component of the dataset generator 100 may also attach attributes to a contact in a profile of the contact. For example, Active Directory of Windows may attach permission attributes to a user. The example dataset generator 100 may utilize these permission attributes, and others, associated with each contact.

Dataset generator 100 also includes AI analyzer 112, which mines attributes of strategy elements or "action steps" performed by employees of a business and/or users of the dataset generator 100. The AI analyzer 112 mines recorded user actions from logs, records, and histories referred to herein as "user strategies 108" associated with individual members of the business. The AI analyzer 112 stores attributes of these actions as relational data structure 116 in a database of collective strategies 103, within the corporate database 102. The dataset generator 100 creates both the global contact dataset 101 and the database of collective strategies 103 with respective attributes of the contacts and strategies aligned with business objectives of the enterprise, or at least structured for compatibility with operations of the dataset generator 100.

The AI analyzers 110, 112 discover attributes of contacts and strategy elements by AI operations that include data mining, pattern recognition, and machine learning processes, for example. As used herein, an "AI analyzer," such as the AI analyzer 110 and/or the AI analyzer 112 refers to an engine, component, or mechanism that mines attributes from a target database or target information source by applying one or more artificial intelligence techniques. An AI analyzer 110, 112 can also include conventional analysis tools: the AI analyzers 110, 112 are not limited to pure AI mechanisms, algorithms, tools, and modules. The AI analyzers 110, 112 create relational data structures 114, 116 to organize the mined attributes from the respective contact datasets 104 and user strategies 108.

Some attributes of a contact to be stored in the global contact dataset 101 may be discovered by the AI of the dataset generator 100 but not previously assigned to the contact through human agency, e.g., not previously assigned in a contact dataset 104 residing on a personal device of an individual user. That is, the AI of the dataset generator 100 may assign an attribute to a contact, and the connection between the contact and the attribute may be previously unknown to humans or not immediately obvious from a human standpoint before being assigned or discovered by AI. As a simple example, the AI capabilities of the dataset generator 100, such as data mining and pattern recognition, may discover that a person to be named in the global contact dataset 101 is one of several hundred people in a given locale affected by a thunderstorm the previous week, who is also eligible to buy a certain product or to receive certain relief. The example dataset generator 100 may discover such attributes of a contact, but may also generate a value not previously recorded for an attribute, or may even invent a new attribute to be attached to the contact in the global contact dataset 101 based on the AI inherent in the example dataset generator 100.

For example, the dataset generator 100 may associate a new attribute "length of employment" with a contact, an attribute not previously associated with the contact or requested by any human user. The dataset generator 100 may further create (invent, innovate) attributes to be attached to a contact through pattern recognition applied across numerous contacts datasets 104. For example, the dataset generator 100 may decide to attach the attribute "yard has swimming pool" to contacts in the global contact dataset 101 of an insurance company who live in a fire zone, without being directly programmed to do so by any human operator. Through pattern recognition, the dataset generator 100 may find other useful correlations to be stored as attributes of contacts that are not immediately apparent to human logic: "almost all customers in Ontario, Canada buy Mustangs," or "contact is 37 years old, wherein the company has very few customers in the age range of 35-40."

The attributes discovered or determined for a contact are associated with the contact as a configuration of data elements, for example the relational data structure 114, and stored in the global contact dataset 101. The configuration of data elements can include relationships between different attributes of the contact, as noted above. For example "owns pet" may be associated with "size of yard" in the global contact dataset 101. The dataset generator 100 is capable of using various schemas and hierarchies to organize attribute relationships, such as star schemas, snowflake schemas, user-defined hierarchies, and hierarchies configured or designed by the AI of the dataset generator 100.

In an example corporate setting, the dataset generator 100 includes or has access to the corporate database 102 that is centrally accessible in part or in whole to all users of the dataset generator 100. Although referred to as a corporate database 102 in FIGS. 1-3, the corporate database 102 is the data of the particular organization, home, or individual user hosting or operating the dataset generator 100. In FIG. 1, the corporate database 102 is accessible to on-site members of a headquarters by LAN, for example, and to mobile devices and smartphones of remote members of the organization by Internet and cellular services, for example.

The corporate database 102 may be a collection of many databases, such as the example global contact dataset 101, and the database of collective strategies 103 hosted on multiple servers, and/or hosted by cloud services. In an illustrative example, the corporate database 102 of an insurance company may include the global contact dataset 101, the database of collective strategies 103, a database of corporate resources, and other databases, such as the company's operating procedures and policies, the company's software in general, identities of potential customers, a database of insurance policies both live and historical, and a database of insurance claims and their outcomes, for example. The same corporate database 102 may have numerous other databases and other types of information stores included in the collection that makes up the overall corporate database 102. Depending on implementation, the corporate database 102 may be distributed in servers at multiple geographical locations and/or dynamically maintained through cloud storage services.

In FIG. 1, the contact datasets 104, previously compiled by one or more users via one-at-a-time manual selection and/or by conventional filters 106 that are user-selected to be executed by third-party applications, are shown as separate from the global contact dataset 101 of the corporate database 102 for illustrative purposes. But manually or conventionally created contact datasets 104 may also reside as stored data within the corporate database 102, or may be distributed on local machines of users within the enterprise. As introduced above, the corporate database 102 includes the global contacts database 101, a main source of unselected contacts available to be selected by the dataset generator 100 when generating a customized contact dataset 124. But the global contacts dataset 101 is not the only source of contacts, the dataset generator 100 may draw upon public databases and information feeds, as well as the contact datasets 104 of individual users to make a customized contact dataset 124.

A flow cycle 109 in FIG. 1 between user strategies 108, various selection filters 106, and resulting contact datasets 104 represents manual and individual user-creation of contact datasets 104 and the underlying user strategies 108 to do so, which the dataset generator 100 can utilize via AI. The user strategies 108 are attributes of user actions that have been logged or recorded at a user interface (FIG. 3) or captured by a processor, or sensed and interpreted as choices and selections of the user. The user actions and choices that are present when manually or conventionally creating a contact dataset 104 often embody elements of experience, luck, research, and insight that can be mined as assets when there is a record, such as a log from which attributes of strategy can be captured and stored in the user strategies 108. The attributes contained in the user strategies 108 may be extracted from records of filters 106 that users have applied to construct a contact dataset 104, URLs from which users researched concepts to build a contact dataset 104, and identifiers of information sources from which users selected contacts, for example.

The dataset generator 100 can also use metadata generated by conventional third-party applications in order to make a record of user strategies 108, when such metadata is available though APIs or through other means. The flow cycle 109 can result in iterative improvement of both the contact datasets 104 created by means of the user strategies 108 and the user strategies 108 captured in making the iteratively improving contact datasets 104, each improves the other. The dataset generator 100 mines this flow cycle 109 representing local user-creation of contact datasets 104 because such manually created contact datasets 104 are a root level source of contacts and attributes for building the global contact dataset 101 of the enterprise and generating each customized contact dataset 124 by applying the AI of the dataset generator 100.

The dataset generator 200 can thereafter use the recorded user strategies 108 to reproduce successful results, when one or more of the user strategies 108 are found to be valuable, or can be used to make a general template (316) embodying how to perform a task of the enterprise correctly or how to increase a chance of success. "Success" is used herein to designate success objectives 208, 210 of the enterprise, as described above. Attributes of the user strategies 108 deemed useful by the AI of the dataset generator 100 are mined by the AI analyzer and stored as relational data structure 116 in the collective strategies database 103 of the corporate database 102.

The dataset generator 200 may also apply and develop its own criteria for gauging success of a contact dataset 104 or user strategies 108 through pattern recognition, based on sales for example, or in the case of an insurance company, based on policy renewals, decreases in expenditures and claims payouts, increases in new clients, and so forth. The dataset generator 200 may infer some attributes based on other attributes. For example, the AI executive engine 302 may link a success metric to a determination of a single agent selling a certain number of insurance policies.

The data mining capability of the AI analyzers 110, 112 may be trained 119 by content already present in the corporate database 102. Just as the AI analyzers 110, 112 build the corporate database 102 by storing the relational data structures 114, 116 in the corporate database 102, the corporate database 102 in turn can inform and train 119 the AI analyzers 110,112 for the task of data mining the contact datasets 104 and the user strategies 108.

FIG. 2 shows dataset generator 200 illustrating additional components over FIG. 1. Like dataset generator 100 in FIG. 1, dataset generator 200 in FIG. 2 may be implemented in a distributed client/server-based architecture, residing in a hardware system of computing devices, mobile devices, and cloud hardware. FIG. 2 specifically introduces processors 202, and data mining engines 204, 206 associated with AI analyzers 110, 112. The processors 202 (not shown in FIG. 1) provide general control of the dataset generator 200, including the capability of receiving a user request 212 and user specific information 214, for example, and acting on the user request 212 and the user specific information 214. FIG. 2 introduces a new operation of the dataset generator 200 over dataset generator 100 in FIG. 1, namely generating instances of the action steps dataset 224. An action steps dataset 224 is a prioritized set of steps, a "to do list" of action steps for a user, compiled by the AI of the dataset generator 200.

The AI analyzer 110 and data mining engine 204 in FIG. 2 access the contact datasets 104 of individual users of a company. Likewise the AI analyzer 112 and data mining engine 206 access the user strategies 108 of users, when these user strategies 108 are tracked, logged, or recorded and are accessible to the dataset generator 200. The data mining engine 204 may be preprogrammed to fulfill success objectives 208 for generating the customized contact datasets 124, and likewise the data mining engine 206 may be preprogrammed to fulfill success objectives 210 for generating and customizing action steps in each given instance of the action steps dataset 224. The data mining engines 204, 206 may be informed and trained 119 by data previously existing in the corporate database 102 and by new data continually being added to the corporate database 102.

The programmable success objectives 208, 210 may consist of respective target attributes of contacts and strategies, as designated by the enterprise, to be sought after during data mining operations in order to build the global contact dataset 101 in a manner desired by the enterprise. The success objectives 208, 210 may further consist of policies, goals, rules, benchmarks, and search criteria designated by the enterprise. The success objectives 208, 210 may also consist of algorithms programmed into the AI analyzers 110, 112 for seeking certain business goals during data mining, such as increasing a number of new clients, increasing revenue, or increasing quality of service, as examples.

Different triggers may cause the dataset generator 200 to generate a customized contact dataset 124 from the global contact dataset 101, from other databases in the corporate database 102, and/or from other public and private data sources and information feeds. The dataset generator 200 may generate a customized contact dataset 124 based on a user request 212 received at one or more of the processors 202, as introduced above. The dataset generator 200 may also generate a customized contact dataset 124 spontaneously, based on an event detected by the dataset generator 200, such as a natural disaster, or based on a notification (message) received by the dataset generator 200.

When triggered by a user request 212, the dataset generator 200 may parse the user request 212 in order to discover or synthesize search terms and concepts to be used as search criteria for performing queries to satisfy the user request 212. The queries may be executed within the global contact dataset 101, the corporate database 102, or may take the form of Internet searches, web crawling and metasearch operations, or data mining sessions performed on various public sources of information, in order to make the customized contact dataset 124. The dataset generator 200 may parse the user request 212 and select one or more types of informational queries, navigational queries, transactional queries, and so forth, to apply in making the customized contact dataset 124.

Upon receiving the user request 212, occurrence of an event, or reception of a notification, the one or more processors 202 query the global contact dataset 101, corporate database 102, diverse contact datasets 104, and/or public information sources to fulfill the particular user request 212, address the event, or address the notification by creating a customized contact dataset 124 in response. The AI aggregator 120 (not shown in FIG. 2) and machine learning engine 122 process search and query results to find best attributes matching the search criteria, and return a customized contact dataset 124 associated with those attributes. The automation provided by the dataset generator 200 saves the user from compiling a manual list of contacts. The search criteria, parsed from the user request 212 or determined by association with an event or notification, are leveraged by the AI to find attributes stored in the relational data structures 114, 116 of the global contact dataset 101, and to retrieve the identities of contacts corresponding to the found attributes for inclusion in the customized contact dataset 124 being constructed.

As above, the machine learning engine 122 is trained (119) by existing data and new data constantly being stored in the corporate database 102 and may include one or more predictive algorithms to generate the customized contact datasets 124 and the action steps datasets 224. The machine learning engine 122 can prioritize the contacts in a given instance of the customized contact dataset 124 by weighting attributes and simultaneously applying one or more sorting criteria selected by the AI. For example, contacts most affected by a natural disaster may be placed near the top of a customized contact dataset 124 because an urgency attribute is weighted more heavily by the AI for those geographically closest to the disaster. At least some of the sorting criteria may be AI-produced to provide an intelligently prioritized customized contact dataset 124, since the dataset generator 200 may be sorting a set of contacts by attributes developed or invented via pattern recognition and machine learning. In an implementation, the dataset generator 200 provides a description of the prioritization rationale imparted by AI, as prioritization schemes based on machine-generated attributes and AI algorithms may not be humanly obvious at first glance.

In an implementation, the dataset generator 200 may also optionally apply search and/or AI capabilities to determine attributes of the user making a given user request 212 for a given customized contact dataset 124 and/or to determine attributes of the user's circumstances, in addition to parsing the user's request 212 itself. This additional metadata about the user and the user's circumstances is shown as the user specific information 214 in FIG. 2. These attributes of the user and the user's circumstances discovered or determined by AI may be used to give context to user's request. For example, a teenage user may request a customized contact dataset 124 for making phone calls to determine the price or value of certain cars in his area. A user who is an executive agent at an insurance company may make the identical request in the same location, and receive a different customized contact dataset 124 than the teenager receives, because these two users have different attributes in their user specific information 214, even though their user-requests 212 may be the same.

The data mining engine 204 may discover some patterns and relations that are not apparent to human users, but useful to the AI-driven pattern recognition capability of the dataset generator 200. A useful pattern may be discovered between multiple different attributes of one contact, or across one or more attributes distributed throughout multiple user contact datasets 104. The AI analyzer 110 may discover that a given individual always buys more insurance than needed, and always buys the most expensive version of a vehicle. Or, the AI analyzer 110 may discover that all customers in a single neighborhood purchased almost exactly the same automobile insurance policy.

The data mining engine 204 may also discover a pattern with respect to a single attribute spread across numerous instances of the attribute in numerous contact datasets 104. For example, the AI analyzer 110 may find that a certain attribute only contains high and low values across all records in numerous sets of contact datasets 104, but no middle values. The AI analyzer 110 might find that in general there are few contacts represented in the contact datasets 104 between the ages of 20-24 years old, but a high number of contacts in that age group all live in Wichita, Kansas. The data mining engine 204 may discover and record other patterns and relations between attributes within the user contact datasets 104. Both the attributes and the discovered patterns may be stored along with the contact data they relate to as the relational data structure 114 in the global contacts dataset 101.

The data mining engine 206 of the AI analyzer 112 accesses the user strategies 108 to discover attributes within the records of the user strategies 108. The AI analyzer 112 discovers relations and patterns between the attributes within a single record or multiple records of the user strategies 108. The AI analyzer 112 and the data mining engine 206 may be preprogrammed by the enterprise with success objectives 210 consisting of goals, rules, benchmarks, or search criteria. The data mining engine 206 may discover relations and patterns in the user strategies 108 that are not apparent to human users. The data mining engine 206 may discover a pattern with respect to multiple attributes of a single contact, or may discover a pattern among multiple different attributes across multiple records of the user strategies 108. For example, the AI analyzer 112 may discover that user strategies 108 made on Tuesdays are more productive than user strategies 108 made on Fridays. Both positive and negative attributes within the user strategies 108 may be retrieved or discovered by the data mining engine 206. For example, a given company may be interested in discerning actions or steps that failed, in addition to discerning successful user strategies 108. The AI analyzer 112 may store both the attributes mined from the user strategies 108 and the newly discovered relations and patterns between the attributes as relational data structure 116 in the database of collective strategies 103.

In an example scenario, a user who is an insurance agent may automatically obtain a first customized contact dataset 124 of clients affected by a fire disaster in a certain locale, filtered by one or more other variables or criteria. Without prompting, the dataset generator 200 may further provide a second customized contact dataset 124 that shows which of these clients have insufficient fire insurance. Even further, the dataset generator 200 may apply AI to provide a third customized contact dataset 124 showing which of these clients are likely to upgrade their insurance, and which are not.

In the fire disaster example above, the insurance agent may obtain an action steps dataset 224 instructing the agent to follow certain office protocols in a given order after notification of the fire disaster, for example. The action steps dataset 224 may instruct (suggest) that the agent complete certain tasks in a sequence and call or email contacts in a certain order following notification of the fire disaster. The dataset generator 200 may generate the action steps dataset 224 as an automatic derivative of generating the given customized contact dataset 124, or may generate the action steps dataset 224 in response to a user request 212, or may spontaneously generate the action steps dataset 224 by applying AI to circumstances determined by the AI, such as pattern recognition applied to general circumstances of the fire or to a history of fires and their insurance outcomes. This fire disaster example is only provided to illustrate functionality, the dataset generator 200 may provide many other types of customized contact datasets 124 and action steps datasets 224.

FIG. 3 shows dataset generator 300 illustrating additional components over FIGS. 1 and 2. Like dataset generator 100, 200 in FIGS. 1-2, dataset generator 300 in FIG. 3 may be implemented in a distributed client/server-based architecture, residing in a hardware system of computing devices, mobile devices, and cloud hardware. FIG. 3 introduces AI executive engine 302, which includes AI analyzers 110, 112, ..., data mining engines 204, 206, ..., aggregator 120, and machine learning engine 122, as one or more centralized components with respect to other components of the dataset generator 300. Each component of the AI executive engine 302 shown in FIG. 3 is representative, and may consist of multiple instances of the component. Although shown as one module, the AI executive engine 302 may also be distributed, but still collectively considered the AI executive engine 302. The AI executive engine 302 is shown as one module in FIG. 3 to illustrate further functionality of the dataset generator 300, such as mining public data sources, and extending user interfaces 304. Examples of the AI executive engine 302 may have more AI components or fewer AI components than the configuration of the AI executive engine 302 shown in FIG. 3, which has AI analyzers 110, 112, ..., data mining engines 204, 206, ..., aggregator 120, and machine learning engine 122, as example components.

Instances of a user interface 304 of the dataset generator 300 are extended on many different kinds of devices for interacting with the dataset generator 300. An application of the dataset generator 300 is adaptable to multiple computing platforms. Through the user interface 304, a user may access the dataset generator 300, the corporate database 102, and other information sources such as news 308, social media 310, public records 312, and various databases of incidents 314, such as private accident and casualty information of clients, when an insurance enterprise is hosting the dataset generator 300. The user interface 304 allows submission of a user request 212 for a customized contact dataset 124 and/or an action steps database 224 via an instance of the user interface 304 on the particular user's device.

The aggregator 120 gathers attributes mined by the respective data mining engines 204, 206 of the AI analyzers 110, 112. The data mining engines 204, 206 find attributes related to contacts and action steps, matching attributes designated in the success objectives 208, 210 of the enterprise, for example. These various attributes may be mined from the contact datasets 104, the user strategies 108, the corporate database 102, sources of news 308 such as news feeds and websites, social media 310, public records 312, and from other information sources, such as the databases of incidents 314 in the example case of an insurance company hosting the dataset generator 300.

The various attributes related to contacts and action steps are mined, aggregated, analyzed, and can be indexed for storage in the respective relational data structures 114, 116 in the global contact dataset 101 and collective strategies 103 of the corporate database 102. This process constitutes a knowledge-building operation of the dataset generator 300, which may be ongoing, as the dataset generator 300 builds the global contact datasets 101 and the collective strategies 103 and grooms the corporate database 102 with new information as received. The mining of new attributes from the various information sources listed above in order to build the corporate database 102 can also be triggered by a novel user request 212, a new event, or a new notification received by the dataset generator 300. Likewise, the same user request 212, event, or notification may trigger retrieval of attributes from the relational data structures 114, 116 stored in the global contact datasets 101 and collective strategies 103 in order to make a customized contact dataset 124 or an action steps dataset 224. In other words, a trigger initiates building the corporate database 102 while also producing a customized contact dataset 104 and/or an action steps dataset 224. Content for building the corporate database 102 and for producing the customized contact dataset 104 and/or the action steps dataset 224 can come from public information sources as well as from within the enterprise.

In an implementation, the dataset generator 300 may append search criteria drawn from user specific information 214 as metadata to the search criteria derived from the user request 212. This allows the AI capability of the dataset generator 300 to contextualize the user request 212 according to the user submitting the user request 212 and the user's circumstances. Thus, the AI aggregator 120 can collect attributes related to the context, specific attributes, and characteristics of the user, and not just attributes related to the user request 212 itself. For example, the user specific information 214 can include demographic information of the user, information about the user's location and environment, and user attributes from the corporate database 102, such as permissions and the user's role in the enterprise. In some instances, the user specific information 214 may not be directly associated with the user in a discrete database, but may be given an association with the user by the AI capabilities of the dataset generator 300.

In an implementation, the dataset generator 300 may also use its AI capabilities such as machine learning and pattern recognition to generate alerts, tools, and templates, based on ongoing development of the global contact dataset 101 and the collective strategies 103 over a time period. Upon user request 212 or by routine time intervals, the dataset generator 300 may provide a template 316 embodying general steps for completing a task of the enterprise, for creating a document, for creating a contact list, or for interacting with clients.

An example template 316 produced by the dataset generator 300 provides a flow diagram for a customer service representative to follow when providing customer service over the phone, for example. The example template 316 can be filled out further for individual circumstances, but provides a framework for assisting the service representative through a service call and troubleshooting a customer inquiry or complaint, for example. The dataset generator 300 can compile each template 316 from thousands or hundreds-of-thousands of user strategies 108 captured during past exchanges with customers during customer service calls, for example, parsed and analyzed by the AI of the dataset generator 300, and stored in the collective strategies 103 of the corporate database 102. A synchronizer 318 propagates new templates 316 to the various user interfaces 304 customized for each employee or customer service representative of the enterprise. Synchronizing a new template 316 may depend on the particular user's device, the user's customization of the given user interface 304, the user's role and permissions within the enterprise, and the relevancy of the template 316 to the particular user. Thus, some users may only receive part of a template 316 while other users receive a more comprehensive version of the same template 316.

A production stream of templates 316 and version updates may be ongoing as the corporate database 102 grows, as company policies develop and change, as new products arise, and as the company's context in the world changes over time. The synchronizer 318 of the database generator 300 may propagate a stream or an array of the templates 316 over time to users within the company via Internet or cloud functions.

A user interface (UI) morphing component 320 can be included in the dataset generator 300 to customize a user interface 304 of each user in real time. The UI morphing component 320 can introduce, menu, and suggest the templates 316 as they are generated by the dataset generator 300. The UI morphing component 320 can also change the user interface 304 in accordance with best practices 426 propagated by dataset generator 300 via the synchronizer 318. The UI morphing component 320 can also change the user interface 304 of a given user into a training mode display for teaching and prompting the user via a training controller 322 driven by the AI of the dataset generator 300. For example the training controller 322 can prompt a given user to learn a new policy or become aware of new data or a new template 316 of the enterprise via the user interface 304 transformed into a training mode display by the UI morphing component 320.

A feedback, survey, and voting component 324 of the UI morphing component 320 can solicit input from the user via the user interface 304. The feedback, survey, and voting component 324 enables a user to rate or rank customized contact datasets 124 and action steps datasets 224, and to rate or rank individual items in a dataset, or rate the prioritization of a dataset. The user can also rate or submit feedback, on other items, such as the templates 316, instructions/teachings, or proposed policies output or proposed by the AI executive engine 302. The human feedback, surveys, and votes collected by the feedback, survey, and voting component 324 can be used to train the machine learning engine 122 to construct improved datasets, and can be used to weight and optimize attributes of contacts and strategies stored in the global contact datasets 101 and the collective strategies 103. In other words, the feedback, survey, and voting component 324 enables the human users of the dataset generator 300 to collectively direct the AI of the dataset generator 300.

Figure 4:
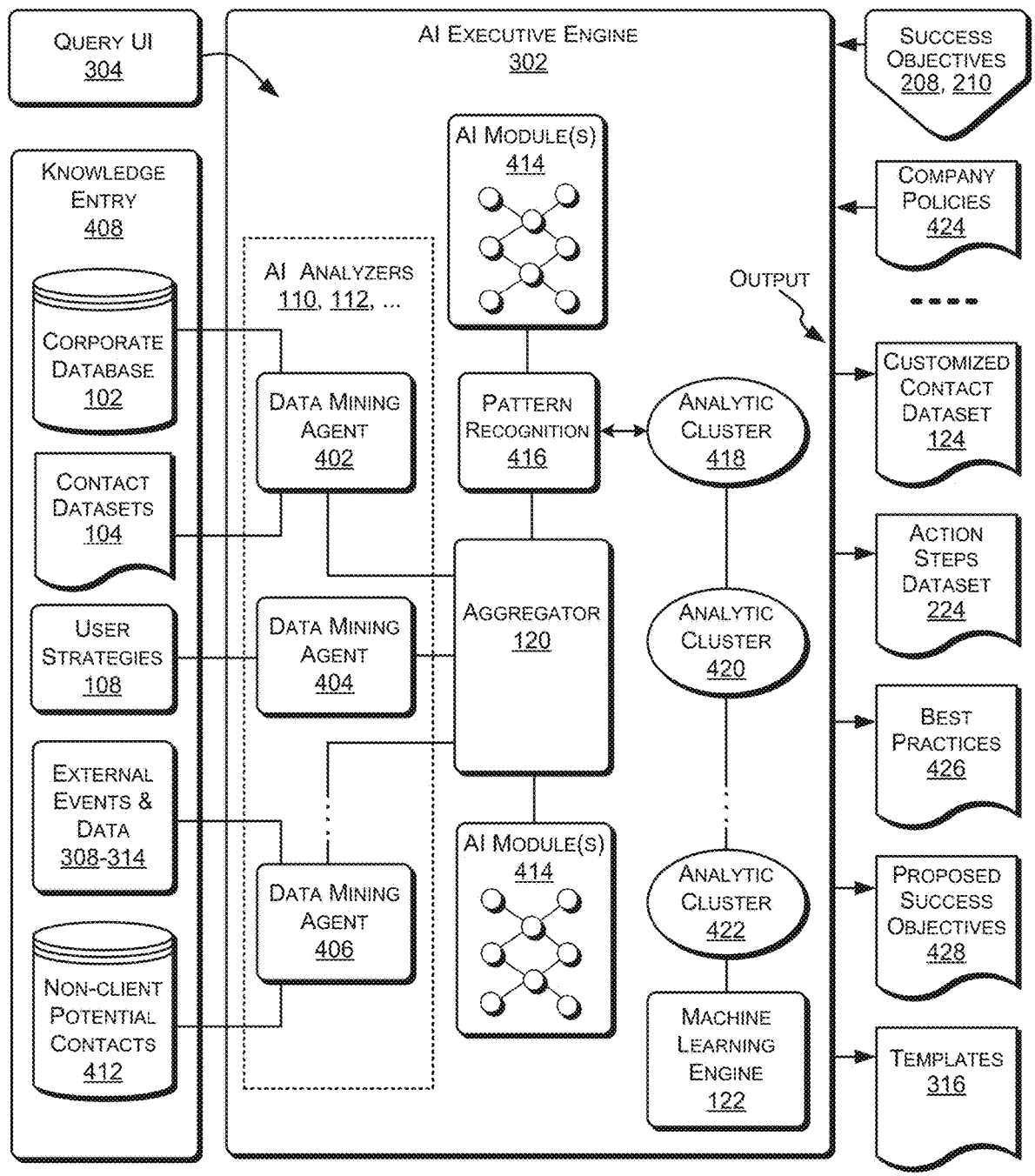
FIG. 4 is a block diagram of an example artificial intelligence (AI) executive engine of the example dataset generator.

FIG. 4 shows another view of the example AI executive engine 302 of FIG. 3 in greater detail. FIG. 4 shows additional structure and functionalities of the AI executive engine 302 over FIG. 3.

The data mining engines 204, 206 of the AI executive engine 302 shown in FIG. 3 may include or be in communication with a series of data mining agents 402, 404, 406, ..., shown in FIG. 4, that are implemented to mine data and attributes from specific sources of information shown in FIG. 4 as "knowledge entry 408" for the AI executive engine 302. Although FIG. 4 illustrates three data mining agents 402, 404, 406, more or fewer of the data mining agents 402, 404, 406 may be used. The data mining agents 402, 404, 406 are capable of reading and recognizing attributes of contacts and strategies from data stores and information feeds of the knowledge entry 408. The data mining agents 402 & 404 & 406 can be customized to interface with selected data sources and can work compatibly with third-party applications that a given user may be running on local and personal devices. In an implementation, a corporation may have a main software application or computer program of the enterprise that all members of the enterprise log into, and the data mining agents 402, 404, 406 interface with data sources through the company's main application. The agents 402, 404, 406 may also be cloud services and scalable both geographically and logically across a dynamically changing number of data sources. The agents 402, 404, 406, or a single agent, may also interact with users as a group via respective user interfaces 304 to input information via the feedback, survey, and voting controller 324, for example.

The AI executive engine 302 may also input the success objectives 208, 210 and company policies 424, for example. The AI executive engine 302 may propose improved success objectives 428 via AI, to be considered by members of the enterprise. The AI executive engine 302 may also generate proposed best practices 426 and the templates 316 embodying the best practices 426 of the business.

The knowledge entry 408 for the AI executive engine 302 may include the corporate database 102, the contact datasets 104, the user strategies 108, the external or public events and data feeds 308-314 of FIG. 3, and non-client potential contacts 412, such as names and phone numbers from a public telephone database or electronic phone book, an email dataset, or another dataset of contacts imported from outside the company. The AI executive engine 302 may also input the aforementioned success objectives 208, 210 and the company policies 424 designated by the enterprise.

In an example operation, the aggregator 120 gathers attributes from various data sources 408 via the data mining agents 402, 404, 406 with AI modules 414 of the AI executive engine 302 as drivers. In an implementation, the AI modules 414 are upgradable as plug-and-play modules or as one or more programmable and scalable cloud computing architectures hosting AI functions that can be upgraded and scaled to an extent of an enterprise. The AI executive engine 302 is not limited to one type of artificial intelligence, in fact the type of AI employed may be selected according to the type of enterprise using the dataset generator 100, 200, 300.

In an implementation, the AI modules 414 use a limited memory type of AI to drive the AI executive engine 302, or use artificial narrow intelligence (ANI) processing schemes and algorithms. In an implementation, the AI executive engine 302 can plug-and-play AI modules 414 that employ future theory of mind AI or other more advanced artificial general intelligence (AGI) types, replacing current AI modules 414 with upgraded AI modules 414. For example, in an example insurance company hosting the dataset generator 300, a theory of mind type of AI can recognize and differentiate various thought processes of the customers, customer service representatives, executive users, and policy-holders.

The aggregator 120 and at least one pattern recognition module 416 generate analytic clusters 418 & 420 . . . 422, as driven by the AI modules 414. The term analytic cluster, as used herein, does not assume any term-of-art meaning or brand name meaning, but means a grouping of data objects resulting from the data mining agents 402, 404, 406 and/or data objects existing as input for statistical analysis and prediction in the machine learning engine 122.

One or more of the machine learning engines 122 may use either supervised learning or unsupervised learning. Supervised learning can be used to train a learning model for making a customized contact dataset 124 using known input and output data for the training, such as existing contact datasets 104 and the global contact dataset 101 as input and customized contact datasets 124 as output, so that the machine learning engine 122 can learn prediction for future output of customized datasets, such as the customized contact datasets 124 and the action steps datasets 224.

The machine learning engine 122 can also use unsupervised learning, which finds relations and hidden patterns or intrinsic structure in the stored and input data and its attributes, generally without specific human direction. The machine learning engine 122 may build a mathematical model based on sample contact datasets 104 or action steps datasets 224 as training data, in order to make predictions and decisions without being explicitly programmed to make particular predictions and decisions.

In an example configuration, the machine learning engine 122 can use an artificial neural network, and the components of the AI executive engine 302 can be modular, as introduced above for the AI modules 414, which can be replaceable and upgradeable. This allows improvement of a given module, such as the machine learning engine 122, which can be replaced with updated versions, or with different makes of the machine learning engine 122 as a module to suit a particular enterprise. The AI modules 414 may also use neural network technology, depending on implementation.

When the machine learning engine 122 uses a neural network, the nodes of the network can be organized into one or multiple layers. In example networks, neurons of one layer connect to neurons of the adjacent layers. An input layer receives data from the analytic clusters 418, 420, 422, and ultimately from knowledge entry 408. When the network is multiple layers, the output layer generates the results, such as the customized contact datasets 124, customized action steps datasets 224, best practices 426, proposed success objectives 428, and templates 316, for example. Neural layers between the input layer and the output layer may be interconnected by various schemes, such as full connection or pooling schemes. An unlayered neural network or a single layer neural network may also be used in implementations of the machine learning engine 122.

The AI executive engine 302 can produce multiple outputs. As generated output, the AI executive engine 302 creates the customized contact datasets 124 and the action steps datasets 224, the templates 316, best practices 426, and proposed success objectives 428 as suggested by artificial intelligence. When approved by the enterprise, the proposed success objectives 428 can be adopted as the success objectives 208, 210, which drive the AI analyzers 110, 112.

Figure 5:
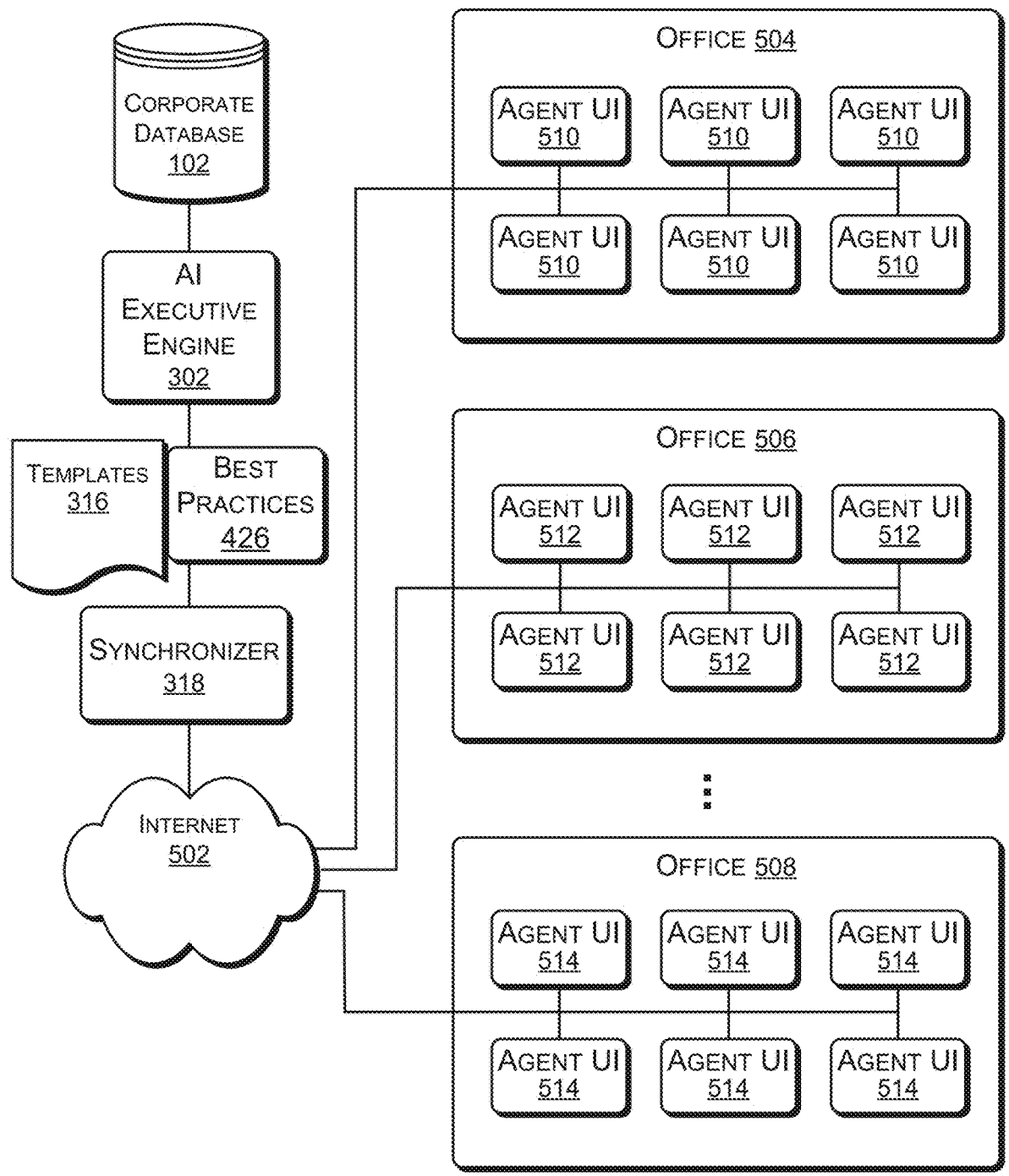
FIG. 5 is a block diagram of an example corporate layout incorporating elements of the dataset generator.

FIG. 5 shows an example corporate layout 500 in which output of the AI executive engine 302 is propagated throughout a company. The AI executive engine 302 develops and maintains the corporate database 102 through AI mediated data mining to fulfill success objectives 208, 210. The AI executive engine 302 generates best practices 426, uniform practices, and templates 316, and the synchronizer 318 uses the Internet 502 and web services, as needed, to update local and remote branch offices 504, 506, 508. Each branch office has one or more user interfaces 304 for individual users or agents 510, 512, 514 in the offices 504, 506, 508. The morphing component 320 customizes the user interface 304 of each individual user as directed by the user or the AI executive engine 302 to propagate the templates 316 and best practices 426. The AI executive engine 302 can produce customized contact datasets 124 for each individual user to help with marketing projects or in response to new products and external events. The AI executive engine 302 can also produce customized datasets of action steps 224 for each individual user to complement the contact datasets 124, or can produce standalone action steps 224 datasets 224 for respective agents 510, 512, 514.

FIGS. 6-9 show example scenarios in which the dataset generator 300 acts as a critical response system within an enterprise. The dataset generator 300 may provide critical responses to both members of the enterprise and clients of the enterprise.

Figure 6:
FIG. 6 is a diagram of an example critical response system driven by the example AI executive engine of the dataset generator.

In FIG. 6, third-party information, such as the news feed 308 or the social media feed 310 may be mined and aggregated by the AI executive engine 302 and may trigger automatic generation of an alert 600, such as a visual representation of a fire in a location, displayed on a user interface 304 of a computing device or smartphone. The alert 600 may be an electronic map showing the type of event and specific locations and magnitudes of triggering events. The AI executive engine 302 may also show the locations of clients or customers of the enterprise on the same electronic map, in relation to the emergency or the catastrophic events.

Figure 7:
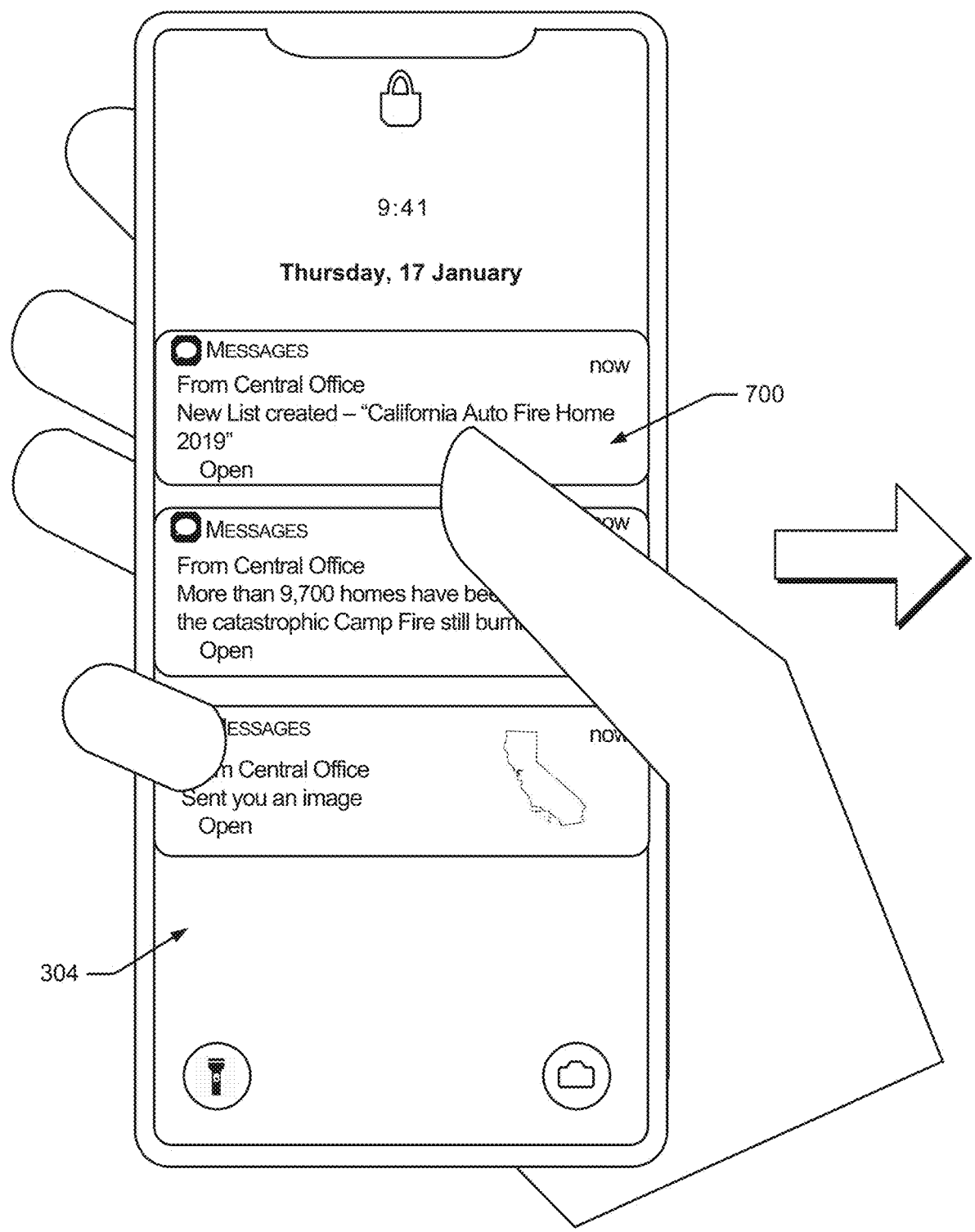
FIG. 7 is a diagram of smartphone notifications propagated by the example AI executive engine of FIG. 6.

In FIG. 7, the user may receive notifications 700 on the user interface 304 of the computing device or smartphone. The notifications 700 may refer to the alert 600 or to news causing the alert 600, and may provide notice that a customized contact dataset 124 has been sent to the user in response to the alert 600. Likewise, a notification 700 may provide notice that an action steps dataset 224 has been sent to the user in response to the alert 600.

Figure 8:
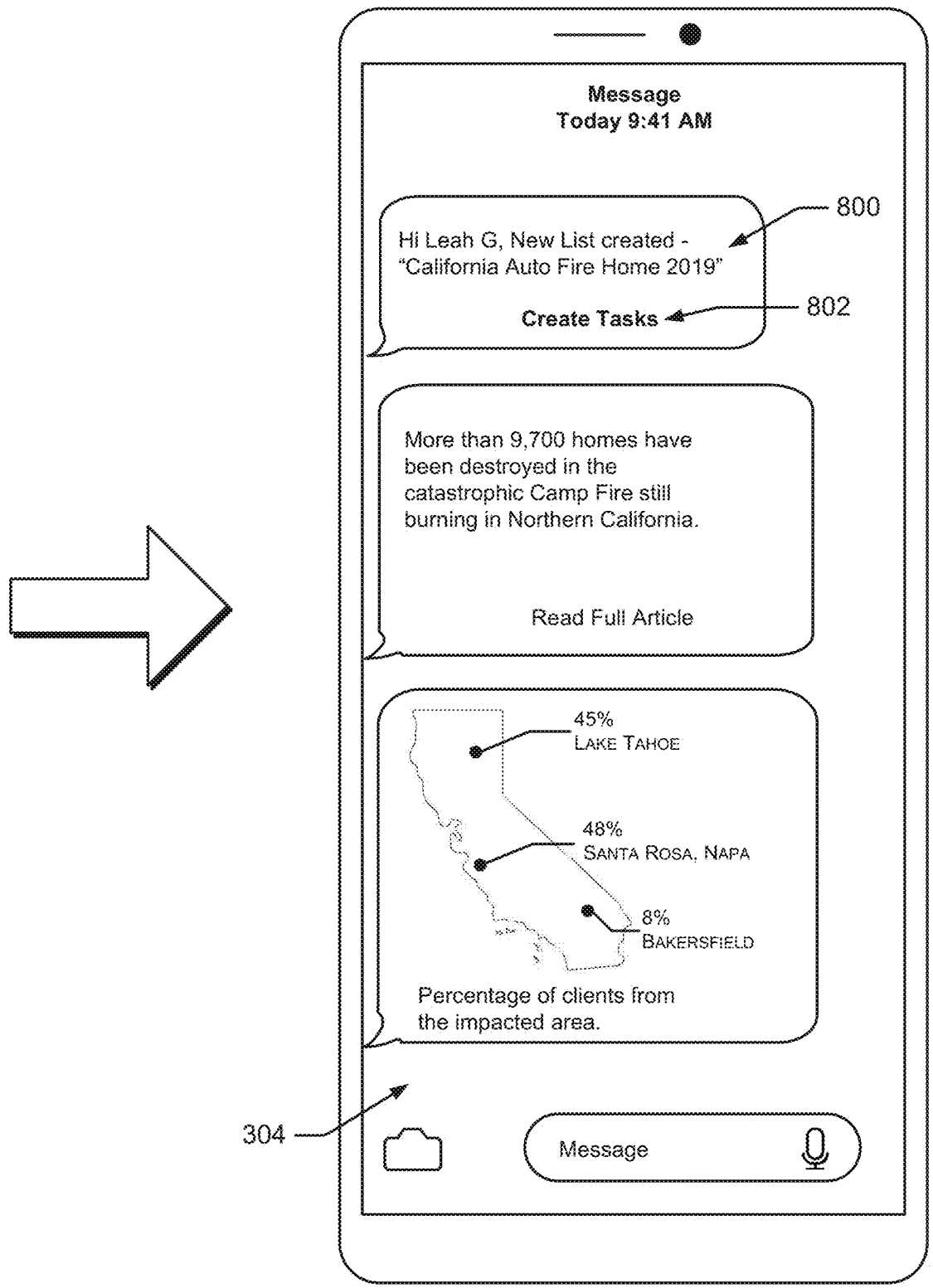
FIG. 8 is a diagram of smartphone messages corresponding to the notifications propagated by the example AI executive engine of FIG. 6.
Figure 9:
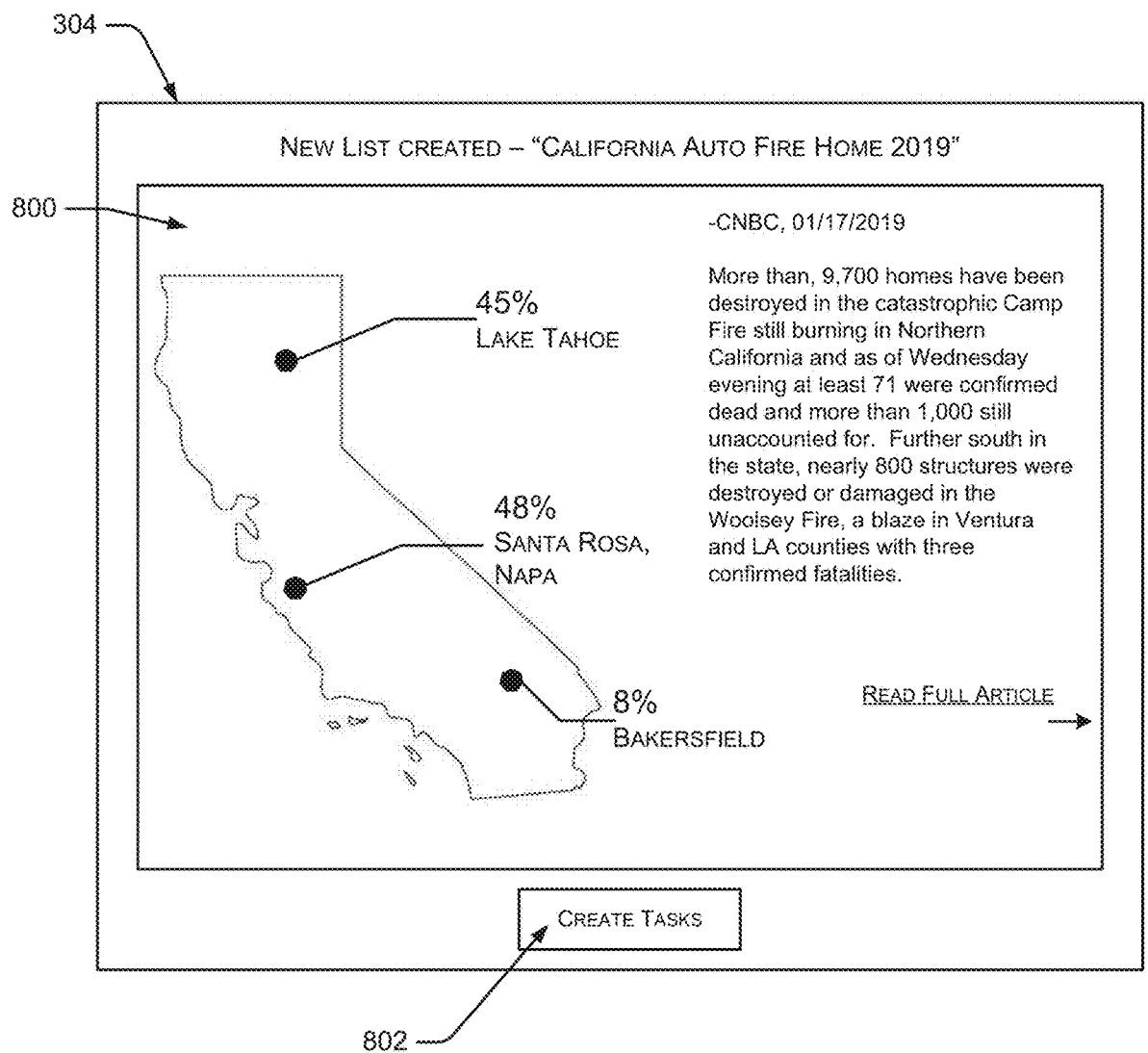
FIG. 9 is a diagram of an example map notification sent to a user by the example AI executive engine of FIG. 6.

FIGS. 8-9 show full messages 800 associated with each of the notifications 700 of FIG. 7, detailing the information abbreviated in the notifications 700. The dataset generator 300 may send one or more customized contact datasets 124 and/or one or more action steps datasets 224 in response to the alert 600, or may send links 802 in the messages 800 giving the user a choice to trigger creation of a customized contact dataset 124 or an action steps dataset 224 in response to the critical alert 600.

Information from the social media feed 310 or from a public records database 312 may indicate a life-changing event, such as purchase of a new home, a new car, birth of a child, and so forth, which may be programmed to trigger a response from the dataset generator 300. The triggering event, data, or notification can cause the AI executive engine 302 to generate the customized contact dataset 124 and the action steps dataset 224 for a user or an insurance agent, identifying the event and the customers potentially impacted by the event. Moreover, items listed in the customized contact dataset 124 and the action steps dataset 224 may be ranked based on a number of factors, including proximity to the event, and/or may include additional information including a preferred form of communication for the customer.

Figure 10:
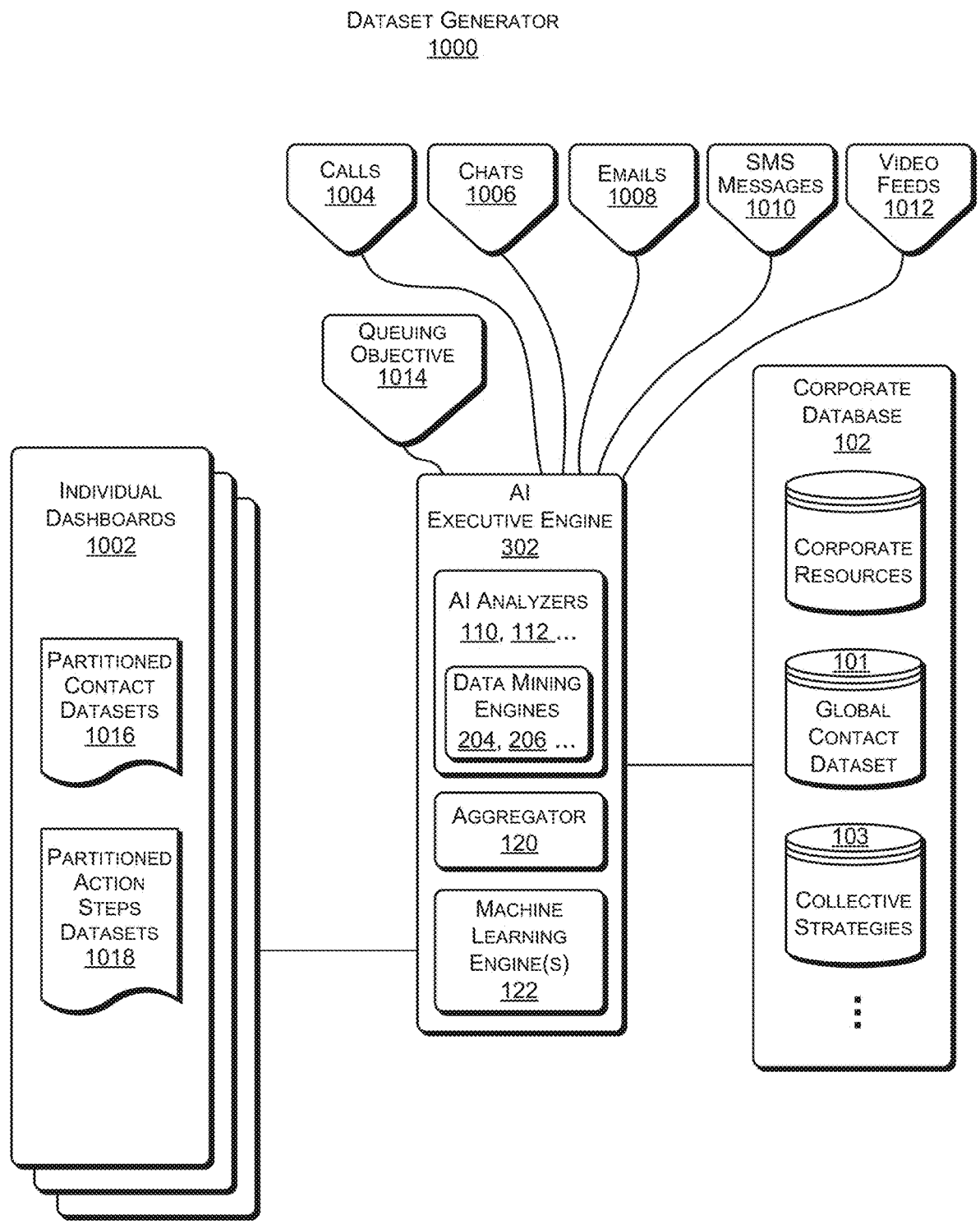
FIG. 10 is a block diagram of an example dataset generator for aggregating customer contacts in a customer service center.

FIG. 10 shows a dataset generator 1000 in context of a call center or customer service center of the enterprise. Each agent or customer service representative of the enterprise has an individual dashboard 1002 display and user interface, for handling live calls 1004, live chats 1006, current emails 1008, current SMS messages 1010, live video feeds 1012, and so forth, from customers being serviced in real time. A queuing scheme for the calls 1004, chats 1006, video feeds 1012, and so forth of the enterprise adheres to a queuing objective 1014 of the enterprise, which may be standard across an industry or proprietary to the enterprise.

In an implementation, the dataset generator 1000 produces a customized contact dataset 124 and/or an action steps dataset 224 in real time to display on the individual dashboard 1002 of an agent to assist in servicing the client or customer in real time. The customized contact dataset 124 and/or the action steps dataset 224 can be dynamically prioritized in real time by attributes such as urgency, time holding, value to the company, anticipated ease of dispatching, disposing, or resolving an issue, level of complaint, and many other possible queuing attributes.

In an implementation, the dataset generator 1000 partitions and intelligently distributes partitioned customized contact datasets 1016 and/or partitioned action steps datasets 1018 across available agents of the enterprise, by attributes of the agents, such as availability or skill level handling a particular kind of customer contact. For example the machine learning engine(s) 112 may partition and distribute real time customer contacts among a group of current agents, such as an active shift of customer service representatives of the enterprise who may be stationed in different departments or in different geographical locations.

In an implementation, the dataset generator 1000 mines contacts from the calls 1004, chats 1006, emails 1008, SMS messages 1010, and video feeds 1012 of the enterprise, applies a pattern recognition process to determine attributes of the contacts, wherein at least one of the attributes is aligned with a queuing objective 1014 of the enterprise, arranges the contacts and associated attributes in a first relational data structure, and through the machine learning engine(s) 122, displays the contacts on a dashboard 1002 of an agent of the enterprise in a queuing order aligned with the queuing objective 1014 of the enterprise.

The dataset generator 1000 may train the machine learning engine(s) 122 in real time simultaneous with displaying the contacts on the dashboard 1002 of the agent in real time, in the queuing order aligned with the queuing objective 1014 of the enterprise.

Figure 11:
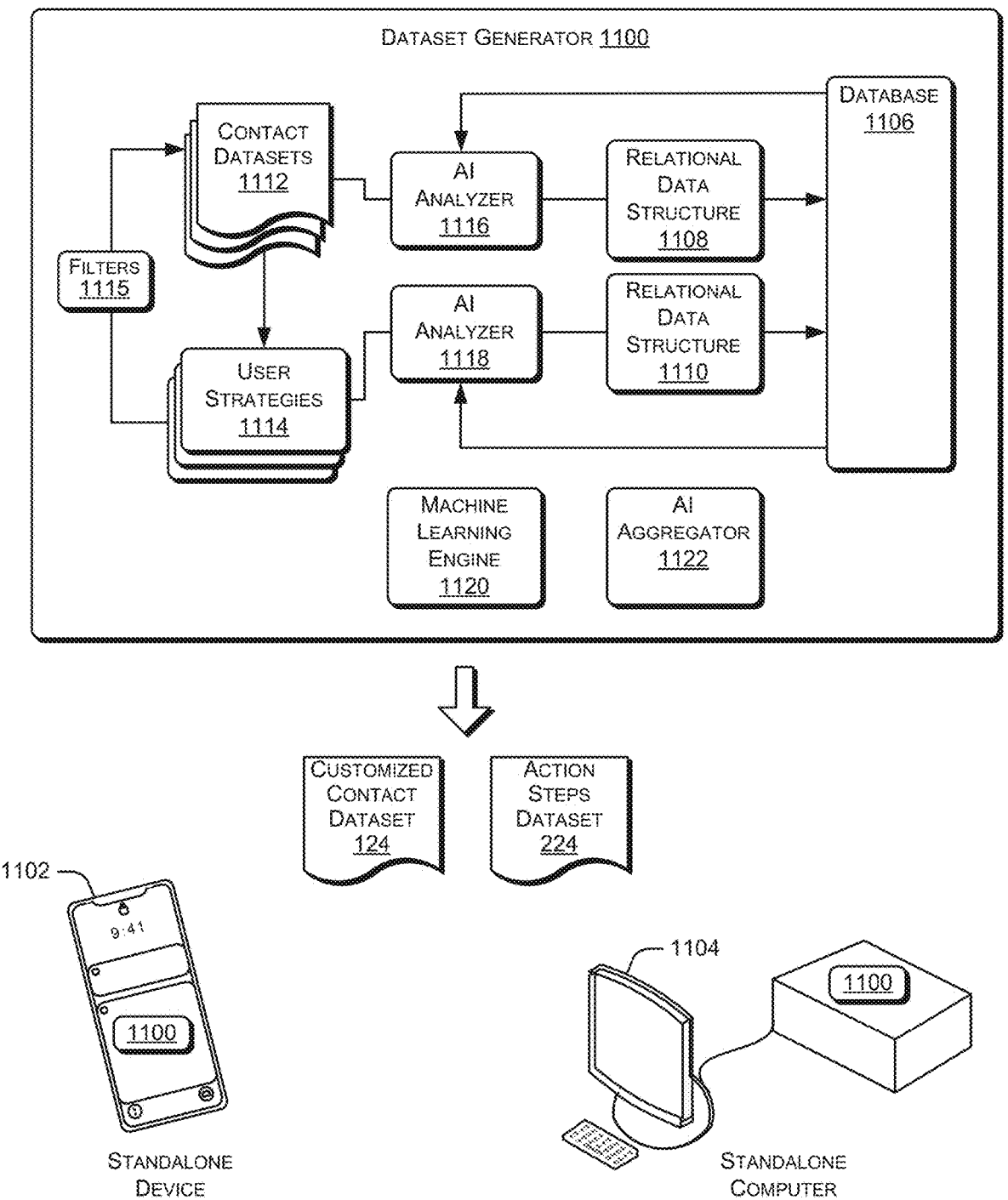
FIG. 11 is a block diagram of an example dataset generator suitable for a standalone device or a standalone computer.
Figure 12:
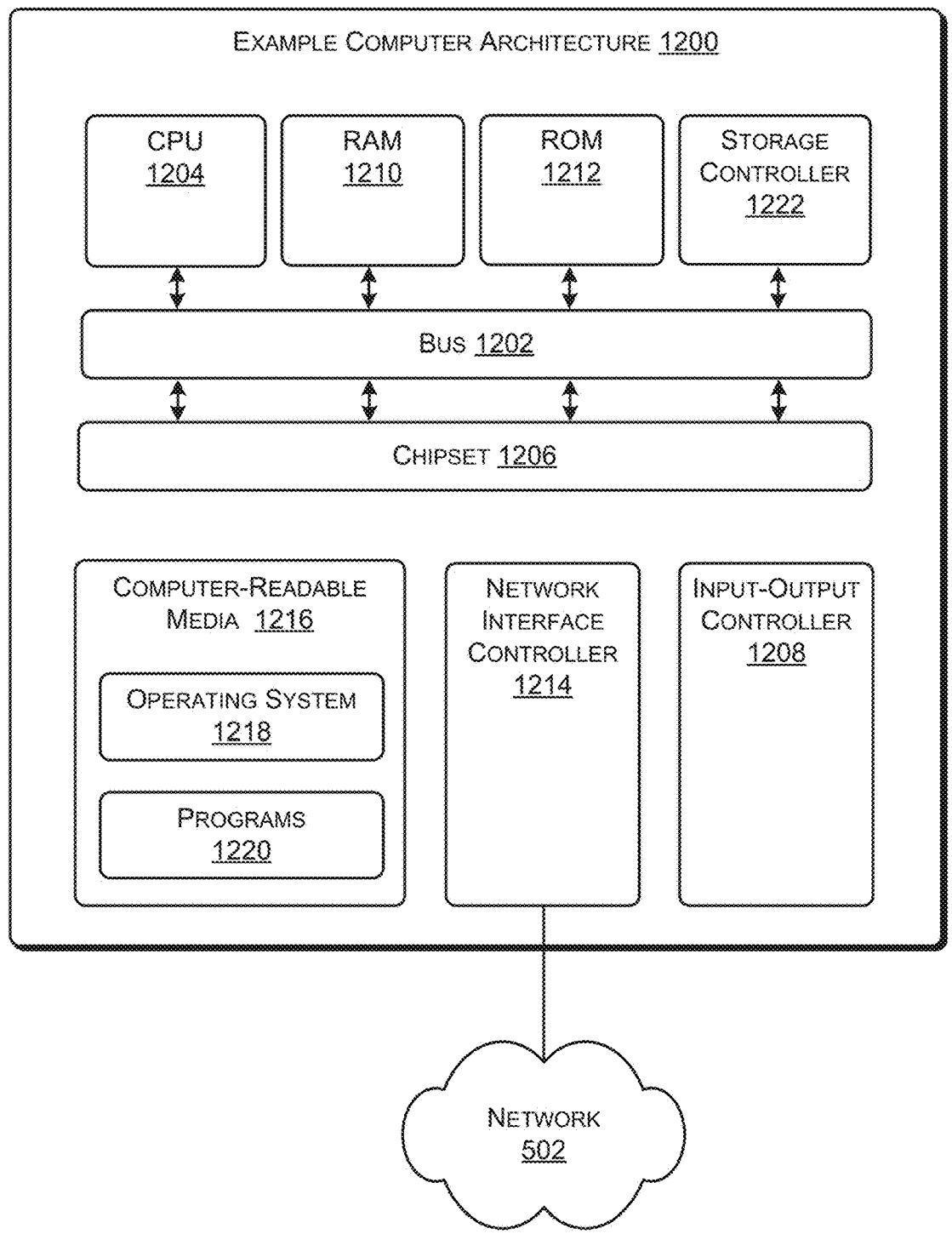
FIG. 12 is a block diagram of an example computer architecture suitable for hosting example dataset generators.

FIG. 11 shows an example dataset generator 1100 suitable for a standalone device 1102 or standalone computer 1104. The dataset generator 1100 can reside as a program or application in each standalone device 1102 or standalone computer 1104. FIG. 12 (next Figure) provides components of an example computing device capable of hosting the example dataset generator 1100. The example dataset generator 1100 possesses the functionalities of the previously described dataset generators 100, 200, 300, 1000 for use in an enterprise, but configured for a single individual user on the standalone device 1102 or standalone computer 1104, for example.

In FIG. 11, the dataset generator 1100 includes a database 1106, which may be a master database with respect to other databases on the standalone device 1102 or standalone computer 1104, or may be one or more local databases capable of collecting data and storing relational data structures 1108 and 1110. The standalone device 1102 or standalone computer 1104 may have access to the Internet (502)

or other networks, but may also implement and run the example dataset generator 1100 when isolated from communication links with the Internet (502) or other networks. The layout of components in FIG. 11 is one example configuration to show components as implemented on a standalone device 1102 or standalone computer 1104, including their functionality, process flow, and interaction of the components with each other.

The example dataset generator 1100 has access to contact datasets 1112 and user strategies 1114 of the user. Filters 1115 selected by the user or applied by the dataset generator 1100 can assist in creating or deriving the contact datasets 1112 from the user strategies 1114. The user strategies 1114 may be previously compiled by the example dataset generator 1100 from actions of the user captured from input devices or captured from search terms and search strategies of the user.

The relational data structures 1108, 1110 are representative. These may be third-party resources and/or cloud functions that relate data elements to each other, such as attributes of a contact to other attributes of the contact, for example, or attributes of a strategy to other attributes of the strategy, for example.

The example dataset generator 1100 builds the database 1106 for the user in an ongoing manner from the contact datasets 1112 and user strategies 1114 of the user. To do this, AI analyzer 1116 mines contacts and associated attributes from the contact datasets 1112 (and from other information sources, when connected to the Internet 502 or when networked to other devices) and stores these contacts and attributes as the relational data structure 1108 in the local database 1106. Likewise, AI analyzer 1118 mines strategies and associated attributes from the user strategies 1114 and stores these strategies and attributes as the relational data structure 1110 in the local database 1106.

The example dataset generator 1100 produces a customized contact dataset 124 and/or an action steps dataset 224 from the database 1106 (and from other information sources) upon user request or other trigger, such as occurrence of an event or upon receiving a notification. The action steps dataset 224 is a prioritized set of steps, a "to do list" of action steps for the user, compiled by the AI of the dataset generator 1100. These two operations of (1) building the local database 1106 by mining contact datasets 1112 and user strategies 1114, and (2) producing instances of the customized contact dataset 124 and the action steps dataset 224 from the database 1106 and from other information sources can be simultaneous, even though they are separate processes. These two operations, however, do not need to be simultaneous.

In general, the example dataset generator 1100 can produce a customized set of objects. The customized contact dataset 124 and the action steps dataset 224 are just two examples of customized sets of objects. The action steps dataset 224 is a prioritized set of steps, a "to do list" of action steps for the user, compiled by the AI of the dataset generator 1100, and a particular action steps dataset 224 may be derived at least in part, from a particular customized contact dataset 124.

The contact datasets 1112 utilized by the dataset generator 1100 are not limited to just names, addresses, phone numbers, and email addresses of each contact. In a personal context, a contact dataset 1112 may include associations between a person with other persons or companies, roles, positions, relationships, personal history (ies), photos, and many other data elements.

Some attributes of a contact in a contact dataset 1112 may be immediately evident, such as person's age or a person's address or phone number. Other custom attributes may be purposely attached to contacts in a contact dataset 1112 by the user. An operating system of the standalone device 1102 or standalone computer 1104 that is hosting the dataset generator 1100 may also attach attributes to a contact in a profile of the contact in a contact dataset 1112. For example, Active Directory of Windows may attach permission attributes to a user. The example dataset generator 1100 may utilize or at least store these permission attributes, and others, associated with each contact.

The user strategies 1114 mined by the AI analyzer 1118 are strategy elements or "action steps" performed by the user of the dataset generator 1100. The AI analyzer 1118 mines recorded user actions from logs, records, and histories referred to as the user strategies 1114 of the user, herein. The AI analyzer 1118 stores attributes of these actions as relational data structure 1110 in the database 1106.

The AI analyzers 1116, 1118 discover attributes of contacts and strategy elements by AI operations that include data mining, pattern recognition, and machine learning processes, for example. As used herein, an "AI analyzer," such as the AI analyzer 1116 and/or the AI analyzer 1118 refers to an engine, component, or mechanism that mines attributes from target databases or target information sources by applying one or more artificial intelligence techniques. The AI analyzers 1116, 1118 can also include conventional analysis tools: the AI analyzers 1116, 1118 are not limited to pure AI mechanisms, algorithms, tools, and modules. The AI analyzers 1116, 1118 create the relational data structures 1108, 1110 to organize the mined attributes from the respective contact datasets 1112 and user strategies 1114.

Some attributes of a contact or a strategy to be stored in relational data structures 1108, 1110 in the database 1106 may be discovered by the AI of the dataset generator 1100 but not previously assigned to the contact or the strategy through human agency of the user, e.g., not previously assigned in a contact dataset 1112 or in user strategies 1114 residing on the standalone device 1102 or standalone computer 1104. That is, the AI of the dataset generator 1100 may assign an attribute to a contact or a strategy, and the connection between the contact and the respective attribute or the strategy and the respective attribute may be previously unknown to the human user or not immediately obvious from a human standpoint before being assigned or discovered by the AI of the dataset generator 1100.

The example dataset generator 1100 also includes AI aggregator 1120 and machine learning engine 1122. These components function as described above with respect to dataset generators 100, 200, 300, 1000 to generate instances of the customized contact dataset 124 and/or the action steps dataset 224.

Processors of the standalone device 1102 or standalone computer 1104 provide general control of the dataset generator 1100, including the capability of receiving a user request for a customized contact dataset 124 and/or an action steps dataset 224 from the dataset generator 1100.

FIG. 12 shows an example computer architecture 1200 for a standalone device 1102, standalone computer 1104, or networked server or client capable of hosting the dataset generators 100, 200, 300, 1000, and 1100, and capable of executing program components implementing the functionalities described above. The computer architecture 1200 shown in FIG. 12 illustrates a conventional computer, workstation, desktop computer, laptop, tablet, smart phone, network appliance, e-reader, or other computing device, and can be utilized to execute the software components or instructions presented herein. The example computer architecture 1200 may also comprise networked devices such as servers, switches, routers, hubs, bridges, gateways, modems, repeaters, access points, etc.

The example computer architecture 1200 may include a baseboard or motherboard, which can be a printed circuit board to which a multitude of components or devices are connected by way of a system bus 1202 or other electrical communication paths. In one illustrative configuration, one or more central processing units or "processors" (CPUs) 1204 operate in conjunction with a chipset 1206 via the system bus 1202, controlled by one or more input/output controllers 1208. The CPUs 1204 can be standard programmable processors that perform arithmetic and logical operations necessary for the operation of the computer architecture 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard. The chipset 1206 can provide an interface to a random access memory RAM 1210, used as the main memory in the computer architecture 1200. The chipset 1206 can further provide an interface to a computer-readable storage medium such as a read-only memory ("ROM") 1212 or non-volatile RAM ("NVRAM") for storing basic routines that help to startup the computer architecture 1200 and to transfer information between the various components and devices. The ROM 1212 or NVRAM can also store other software components necessary for the operation of the computer architecture 1200 in accordance with the configurations described herein.

The computer architecture 1200 can operate in a networked environment using logical connections to remote computing devices and computer systems through a network, such as the network 502. The chipset 1206 can include functionality for providing network connectivity through a network interface controller (NIC) 1214, such as a gigabit Ethernet adapter. The NIC 1214 is capable of connecting the computer architecture 1200 to other computing devices over the network 502. It should be appreciated that multiple NICs 1214 can be present in the computer architecture 1200, connecting the computer to other types of networks and remote computer systems.

The computer architecture 1200 can be connected to one or more computer-readable media 1216 comprising a data storage device that provides non-volatile data storage for the computer architecture 1200. The storage device 1216 can store an operating system 1218, programs 1220, including one or more parts of the example dataset generators 100, 200, 300, 1000, and 1100, and associated data, which have been described in greater detail herein. The storage device 1216 can be connected to the computer architecture 1200 through a storage controller 1222 connected to the chipset 1206 via the system bus 1202, for example. The storage device 1216 can consist of one or more physical storage units. The storage controller 1222 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer architecture 1200 can store data on the storage device 1216 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1216 is characterized as primary or secondary storage, and the like.

For example, the computer architecture 1200 can store information to the storage device 1216 by issuing instructions through the storage controller 1222 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer architecture 1200 can further read information from the storage device 1216 by detecting the physical states or characteristics of one or more particular locations within the physical storage units.

In addition to the mass storage device 1216 described above, the computer architecture 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer architecture 1200. In some examples, the operations performed by the network 502, and or any components included therein, may be supported by one or more devices similar to computer architecture 1200. Stated otherwise, some or all of the operations performed by the network 502, and or any components included therein, may be performed by one or more instances of the computer architecture 1200 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1216 can store an operating system 1218 utilized to control the operation of the computer architecture 1200. According to one embodiment, the operating system comprises the LINUX operating system. According to another embodiment, the operating system comprises a WINDOWS® OS, or the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 1216 can store other system or application programs and data utilized by the computer architecture 1200.

In one embodiment, the storage device 1216 or other computer-readable storage media is encoded with computer-executable instructions which, when loaded into the computer architecture 1200, transform the computer from a general-purpose computing system into a special-purpose computer capable of implementing the embodiments described herein. These computer-executable instructions transform the computer architecture 1200 by specifying how the CPUs 1204 transition between states, as described above. According to one embodiment, the computer architecture 1200 has access to computer-readable storage media storing computer-executable instructions which, when executed by the computer architecture 1200, perform the various processes described above with regard to FIGS. 1-14. The computer architecture 1200 can also include computer-readable storage media 1216 having instructions stored thereupon for performing any of the other computer-implemented operations described herein.

The computer architecture 1200 can also include the one or more input/output controllers 1208 for receiving and processing input from a number of input devices, such as a keyboard, a mouse, a touchpad, a touch screen, an electronic stylus, or other type of input device. Similarly, an input/output controller 1208 can provide output to a display, such as a computer monitor, a flat-panel display, a digital projector, a printer, or other type of output device. It will be appreciated that the computer architecture 1200 might not include all of the components shown in FIG. 12, can include other components that are not explicitly shown in FIG. 12, or might utilize an architecture completely different than that shown in FIG. 12.

As described herein, the computer architecture 1200 may also comprise one or more of a source device, an intermediary device, and/or a destination or client device. The computer architecture 1200 may include one or more hardware processors 1204 (processors) configured to execute one or more stored instructions. The processor(s) 1204 may comprise one or more cores. Further, the computer architecture 1200 may include one or more network interfaces configured to provide communications between the computer architecture 1200 and other devices, such as the communications described herein as being performed by the source device, intermediary device, and destination device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

Figure 13:
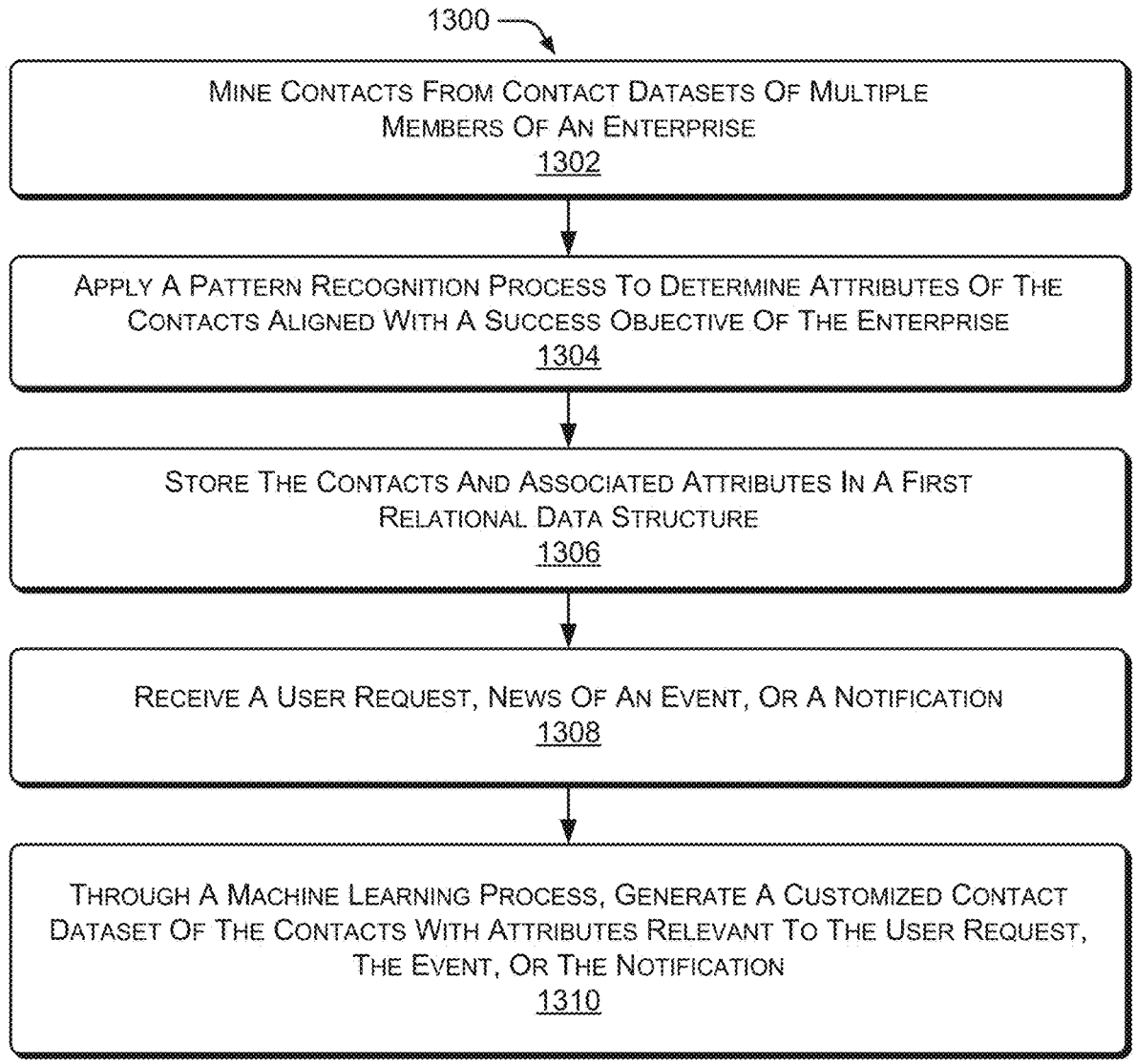
FIG. 13 is a flow diagram of an example method of generating customized datasets.

FIG. 13 shows an example method 1300 of generating a customized dataset. In the flow diagram of FIG. 13, operations of the example method 1300 are shown in individual blocks. The example method 1300 may be executed by the dataset generators of FIGS. 1-3 and 10, for example.

Operation 1302 comprises mining contacts from contact datasets of multiple members of an enterprise. In an implementation, this operation 1302 includes mining contacts in an ongoing manner with a mining process running in the background. The mining can create a global contact dataset 101 for the enterprise from which customized contact datasets 124 can be generated as needed.

Operation 1304 comprises applying a pattern recognition process to determine attributes of the contacts aligned with a success objective of the enterprise. For example, the operation 1302 can include using the AI analyzer 110 to identify a subset of contacts in the contact datasets 104, 1112 to organize under a particular attribute that is important to the enterprise. The operation 1304 can include applying user-programmed pattern recognition, or can include applying pattern recognition in which the AI analyzer 110 finds patterns and relationship in the data, without the patterns being pre-programmed by a user.

Operation 1306 comprises storing the contacts and associated attributes in a first relational data structure. The first relational data structure may allow the contacts to be retrieved when a certain attribute is being queried.

Operation 1308 comprises receiving a user request, news of an event, or a notification. The user request, news of an event, or notification can each be a trigger for initiating the creation of a customized contact dataset 124 that addresses the user request, event, or notification.

Operation 1310 comprises generating, through a machine learning process, a customized contact dataset of the contacts with attributes relevant to the user request, the event, or the notification. In making the customized contact dataset, the operation 1310 may prioritize the contacts according to their relevance to the trigger, or according to one or more other ranking criteria.

Figure 14:
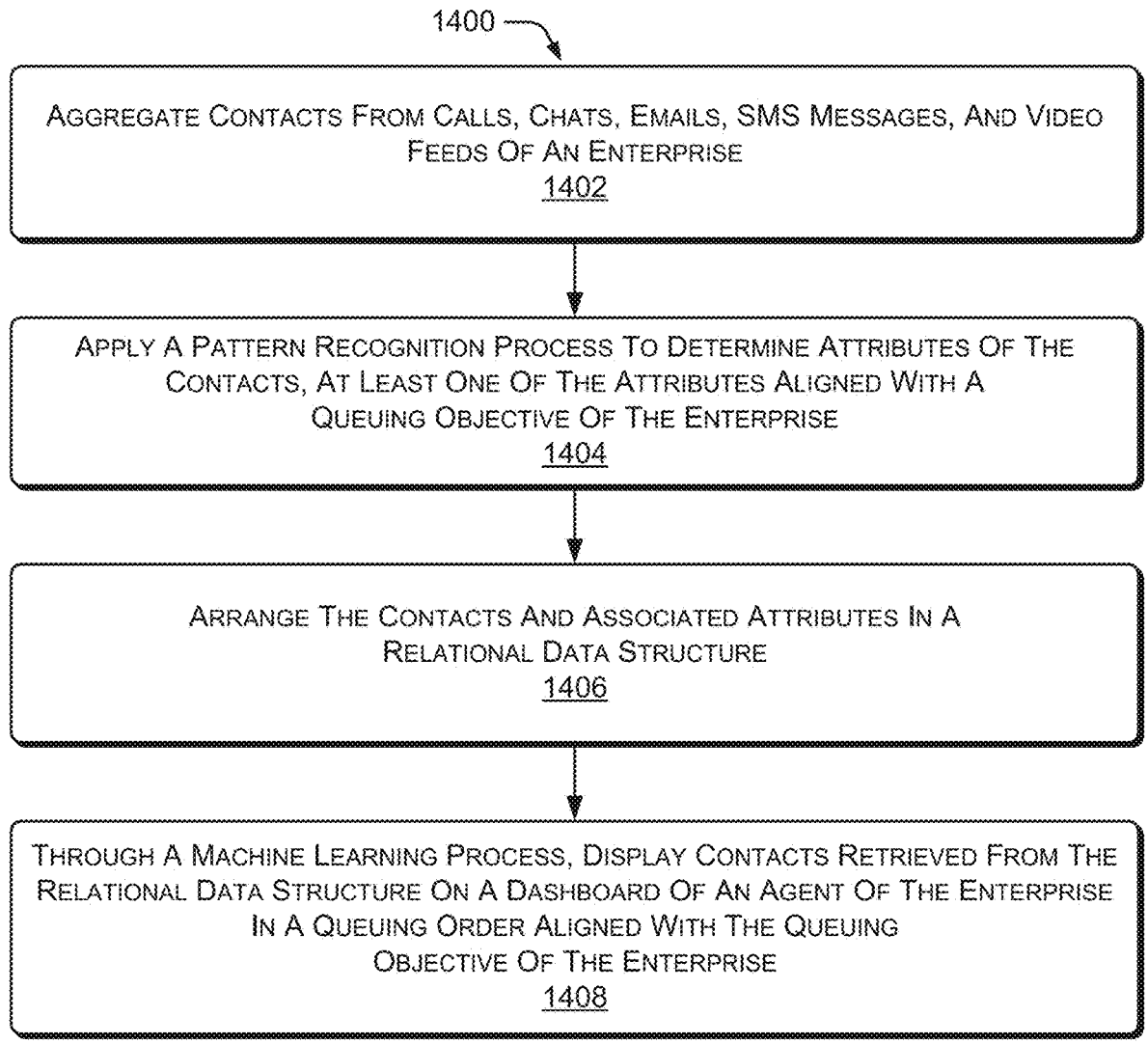
FIG. 14 is a flow diagram of an example method of generating customized datasets in a customer service center.

FIG. 14 shows an example method 1400 of generating a customized dataset in the context of a customer service center or call center of an enterprise. In the flow diagram of FIG. 14, operations of the example method 1400 are shown in individual blocks. The example method 1400 may be executed by the dataset generator of FIG. 10, for example.

Operation 1402 comprises aggregating contacts from calls, chats, emails, SMS messages, and video feeds of an enterprise.

Operation 1404 comprises applying a pattern recognition process to determine attributes of the contacts, wherein at least one of the attributes is aligned with a queuing objective of the enterprise.

Operation 1406 comprises arranging the contacts and associated attributes in a relational data structure.

Operation 1408 comprises applying a machine learning process to display contacts retrieved from the relational data structure on a dashboard of an agent of the enterprise in a queuing order aligned with the queuing objective of the enterprise.

In the foregoing description and in the accompanying drawings, specific terminology and drawing symbols have been set forth to provide a thorough understanding of the disclosed embodiments. In some instances, the terminology and symbols may imply specific details that are not required to practice those embodiments. For example, any of the specific dimensions, quantities, material types, fabrication steps and the like can be different from those described above in alternative embodiments. The term "coupled" is used herein to express a direct connection as well as a connection through one or more intervening circuits or structures. The terms "example," "embodiment," and "implementation" are used to express an example, not a preference or requirement. Also, the terms "may" and "can" are used interchangeably to denote optional (permissible) subject matter. The absence of either term should not be construed as meaning that a given feature or technique is required. The term "engine," as used herein, denotes a piece of hardware that can be animated by programming or particular instructions. The term engine can always mean pure hardware, as the programming or particular logic instructions can be embodied in an arrangement of transistors or in application specific integrated circuits (ASICs), for example.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

While the present disclosure has been disclosed with respect to a limited number of embodiments, those skilled in the art, having the benefit of this disclosure, will appreciate numerous modifications and variations possible given the description. It is intended that the appended claims cover such modifications and variations as fall within the true spirit and scope of the disclosure.

The invention claimed is:

1. A method, comprising:
   executing a data mining engine at an attribute aggregator to acquire first attributes associated with a weather event; and
   in response to acquiring the first attributes:
      mining contacts from contact datasets of multiple members of an enterprise or contact datasets of an individual user;
      applying a pattern recognition process to determine second attributes of the contacts associated with a success objective of the enterprise or the individual user;
      determining, by executing a first machine learning process at a first artificial intelligent (AI) analyzer, that one or more of the first attributes correlates to one or more of the second attributes;
      associating, based at least in part on determining that the one or more of the first attributes correlates to the one or more of the second attributes, a third attribute with the contacts;
      storing the contacts and associated attributes in a first relational data structure; receiving a user request; and
      generating, by executing a second machine learning process at a second AI analyzer:
         a customized contact dataset of the contacts associated with the third attribute, and
         a customized action steps dataset comprising one or more action steps determined based at least in part on historical actions taken by the contacts prior to generating the customized action steps dataset.

2. The method of claim 1, further comprising mining the contacts and associated second attributes associated with the success objective from a public database, a social media site, a news source, or an information feed.

3. The method of claim 2, wherein the second machine learning process further generates the customized contact dataset with contacts selected by the second machine learning process from the contact datasets of the multiple members or the contact datasets of the individual user, the first relational data structure, the public database, the social media site, the news source, and the information feed, the contacts having attributes relevant to one or more of the user request or the weather event.

4. The method of claim 1, further comprising training one or more of the first machine learning process or the second machine learning process with examples of the contacts and examples of the second attributes associated with the success objective of the enterprise.

5. The method of claim 1, further comprising:
   mining strategy elements from user strategy records logged in the enterprise or user strategy records of the individual user;
   applying the pattern recognition process to determine fourth attributes of the strategy elements associated with the success objective of the enterprise or the individual user;
   storing the strategy elements and associated attributes in a second relational data structure; and
   generating, by executing the second machine learning process at the second AI analyzer, the customized action steps dataset comprising the strategy elements with attributes relevant to one or more of the customized contact dataset, the user request, or the weather event.

6. The method of claim 5, further comprising prioritizing the contacts in the customized contact dataset or prioritizing the strategy elements in the customized action steps dataset based on one or more of the user request or the weather event.

7. The method of claim 6, further comprising:
   prioritizing the strategy elements in the customized action steps dataset, and
   prioritizing the contacts in the customized contact dataset based on the prioritized strategy elements in the customized action steps dataset.

8. The method of claim 6, further comprising:
   prioritizing the contacts in the customized contact dataset, and
   prioritizing the strategy elements in the customized action steps dataset based on the prioritized contacts of the customized contact dataset.

9. A method, comprising:
   aggregating contacts of an enterprise;
   executing a data mining engine at an attribute aggregator to acquire first attributes associated with a weather event; and
   in response to acquiring the first attributes:
      applying a pattern recognition process to determine second attributes of the contacts, at least one of the second attributes associated with a queuing objective of the enterprise;
      determining, by executing a first machine learning process at a first artificial intelligent (AI) analyzer, that one or more of the first attributes correlates to one or more of the second attributes;
      associating, based at least in part on determining that the one or more of the first attributes correlates to the one or more of the second attributes, a third attribute with the contacts;
      arranging the contacts and associated attributes in a first relational data structure; and
      executing a second machine learning process at a second AI analyzer to:
         generate an action steps dataset comprising one or more action steps determined based at least in part on historical actions taken by the contacts prior to generating the action steps dataset;
         display contacts retrieved, based on the third attribute, from the first relational data structure on a dashboard of an agent of the enterprise in a queuing order associated with the queuing objective of the enterprise; and
display action steps of the action steps dataset on the dashboard.

10. The method of claim 9, further comprising aggregating the contacts from live calls, live chats, current emails, live SMS messages, and live video feeds in real time;
applying the pattern recognition process in real time; and
executing the second machine learning process in real time to display the contacts on the dashboard of the agent in the queuing order associated with the queuing objective of the enterprise.

11. The method of claim 10, further comprising training the second machine learning process in real time while displaying the contacts on the dashboard of the agent in real time in the queuing order associated with the queuing objective of the enterprise.

12. The method of claim 10, further comprising:
determining, using the second machine learning process and in real time, one or more subsets of the contacts; and
sending the one or more subsets of the contacts for display on a second dashboard of one or more agents of the enterprise in real time.

13. The method of claim 12, wherein the determining the one or more subsets is based at least in part a fourth attribute of the contacts, wherein the second machine learning process matches the fourth attribute of the contact to a fifth attribute of the agent.

14. The method of claim 12, wherein the one or more agents comprise one or more customer service agents of the enterprise; and
wherein the one or more customer service agents of the enterprise are located in a plurality of geographical locations.

15. The method of claim 9, further comprising mining strategy elements from user strategy records of the enterprise;
wherein displaying the action steps of the action steps dataset on the dashboard comprises:
executing the second machine learning process at the second AI analyzer to derive the action steps of the action steps dataset from the strategy elements; and
displaying the action steps of the action steps dataset on the dashboard of the agent of the enterprise in a queuing order associated with a queuing objective of the enterprise.

16. A system, comprising:
one or more processors;
a memory;
a non-transitory computer-readable medium; and
stored instructions executable by the one or more processors for implementing a process comprising:
determining, by executing a data mining engine at an attribute aggregator, first attributes associated with a weather event; and
in response to acquiring the first attributes:
mining contacts from contact datasets of multiple members of an enterprise;
applying a pattern recognition process to determine second attributes of the contacts associated with a success objective of the enterprise;
determining, by executing a first machine learning process at a first artificial intelligent (AI) analyzer, that one or more of the first attributes correlates to one or more of the second attributes;
associating, based at least in part on determining that the one or more of the first attributes correlates to the one or more of the second attributes, a third attribute with the contacts;
storing the contacts and associated attributes in a first relational data structure;
receiving of a user request; and
generating, by executing a second machine learning process at a second AI analyzer:
a customized contact dataset of the contacts associated with the third attribute; and
a customized action steps dataset comprising one or more action steps determined based at least in part on historical actions taken by the contacts prior to generating the customized action steps dataset.

17. The system of claim 16, the process further comprising mining the contacts and associated second attributes associated with the success objective from one or more of a public database, a social media site, a news source, or an information feed.

18. The system of claim 17, the process further comprising the customized contact dataset with contacts selected by the second machine learning process from the contact datasets of the multiple members, the first relational data structure, the public database, the social media site, the news source, and the information feed, the contacts having attributes relevant to one or more of the user request or the weather event.

19. The system of claim 16, the process further comprising training the second machine learning process with examples of the contacts and examples of the second attributes associated with the success objective of the enterprise.

20. The system of claim 16, further comprising stored instructions for:
mining strategy elements from user strategy records logged in the enterprise;
applying the pattern recognition process to determine fourth attributes of the strategy elements associated with the success objective of the enterprise;
storing the strategy elements and associated fourth attributes in a second relational data structure; and
executing the second machine learning process, at the second AI analyzer to generate the customized action steps dataset comprising the strategy elements with attributes relevant to one or more of the customized contact data-set, the user request, or the weather event.

* * * * *